United States Patent
Park et al.

(10) Patent No.: US 10,285,030 B2
(45) Date of Patent: May 7, 2019

(54) METHOD OF PROCESSING CONTENTS AND ELECTRONIC DEVICE THEREOF

(71) Applicant: Samsung Electronics Co., Ltd, Gyeonggi-do (KR)

(72) Inventors: Young-Seon Park, Gyeonggi-do (KR); Hyuk Kang, Gyeonggi-do (KR); Jun-Hak Lim, Gyeonggi-do (KR); Sang-Hyup Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 397 days.

(21) Appl. No.: 14/724,332

(22) Filed: May 28, 2015

(65) Prior Publication Data

US 2015/0350319 A1   Dec. 3, 2015

(30) Foreign Application Priority Data

May 28, 2014   (KR) .................. 10-2014-0064468

(51) Int. Cl.
*H04W 4/80* (2018.01)
*H04L 29/08* (2006.01)

(52) U.S. Cl.
CPC .............. *H04W 4/80* (2018.02); *H04L 67/18* (2013.01)

(58) Field of Classification Search
CPC ...................................................... H04L 67/18
See application file for complete search history.

(56) References Cited

U.S. PATENT DOCUMENTS

| | | | |
|---|---|---|---|
| 6,122,520 A | 9/2000 | Want et al. | |
| 8,738,024 B1* | 5/2014 | Kerr | G01S 5/0252 455/456.5 |
| 9,408,032 B1* | 8/2016 | Kerr | H04W 4/021 |
| 9,454,769 B2* | 9/2016 | Kerr | C07K 14/705 |
| 9,743,222 B2* | 8/2017 | Choi | H04L 67/12 |
| 9,820,093 B2* | 11/2017 | Mayor | H04W 24/02 |
| 9,930,619 B2* | 3/2018 | Kim | H04W 8/24 |
| 2002/0073305 A1* | 6/2002 | Joseph | G06F 9/4401 713/1 |
| 2007/0281692 A1* | 12/2007 | Bucher | G06Q 30/02 455/435.1 |
| 2010/0331016 A1* | 12/2010 | Dutton | H04W 4/02 455/456.3 |
| 2013/0110975 A1* | 5/2013 | Cho | H04N 21/43615 709/217 |
| 2013/0210360 A1* | 8/2013 | Ljung | H04W 4/80 455/41.2 |
| 2015/0339694 A1* | 11/2015 | Robbin | G06Q 30/0207 705/14.1 |
| 2016/0048298 A1* | 2/2016 | Choi | G06F 3/04842 715/846 |

(Continued)

*Primary Examiner* — Lashonda T Jacobs

(57) ABSTRACT

A method and apparatus of an electronic device is provided. The method includes receiving, from a first server, a designated content including at least one piece of information associated with a second server. The method also includes receiving content identification information from the second server when the electronic device is located in a short-range wireless communication area of the second server. The method further includes displaying at least one information that corresponds to the content identification information, from the content received from the first server.

16 Claims, 25 Drawing Sheets

(56) References Cited

U.S. PATENT DOCUMENTS

2016/0092966 A1\* 3/2016 Vigier ................ G06Q 30/0633
            705/26.8
2016/0334494 A1\* 11/2016 Yamauchi ................ G01S 5/02
2017/0068990 A1\* 3/2017 Ogden ............... G06Q 30/0255

\* cited by examiner

METHOD OF PROCESSING CONTENTS AND ELECTRONIC DEVICE THEREOF

CROSS-REFERENCE TO RELATED APPLICATION AND CLAIM OF PRIORITY

The present application is related to and claims the benefit under 35 U.S.C. § 119(a) to Korean Application Serial No. 10-2014-0064468, which was filed in the Korean Intellectual Property Office on May 28, 2014, the entire content of which is hereby incorporated by reference.

TECHNICAL FIELD

The present disclosure relates to a method of receiving a content in an electronic device, and an electronic device thereof.

BACKGROUND

An electronic device receives at least one content through network communication, provides a received content in the electronic device, and transmits a content received from a content provider to at least another electronic device. An electronic device provides a content corresponding to a designated location based on a content obtained from a content provider.

SUMMARY

It is a primary object to provide an electronic device that uses various schemes for requesting a content provided based on a designated location, from a server in real time. However, when network communication between an electronic device and a server is not smoothly executed, the electronic device may not be capable of receiving, from the server, a content provided from a content provider in a position where the electronic device is located, and thus, the content may not be provided.

In an embodiment, irrespective of whether an electronic device and a server are connected through network communication in real time, a content corresponding to a place where the electronic device is located is provided.

In a first example, a method using an electronic device is provided. The method includes receiving, from a first server, a designated content including at least one piece of information associated with a second server. The method also includes receiving content identification information from the second server when the electronic device is located in a wireless communication area of the second server. The method further includes displaying at least one information corresponding to the content identification information from the content received from the first server.

In a second example, an electronic device is provided. The electronic device includes a memory, a display, and at least one processor. The memory is configured to store a received content. The display is configured to display the content. The at least one processor is configured to control a reception of a designated content including information associated with a second server from a first server. The at least one processor is also configured to control a reception of content identification information from the second server when the electronic device is located in a wireless communication area of the second server. The at least one processor is further configured to control a display on the display of at least one information corresponding to the content identification information in the designated content.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
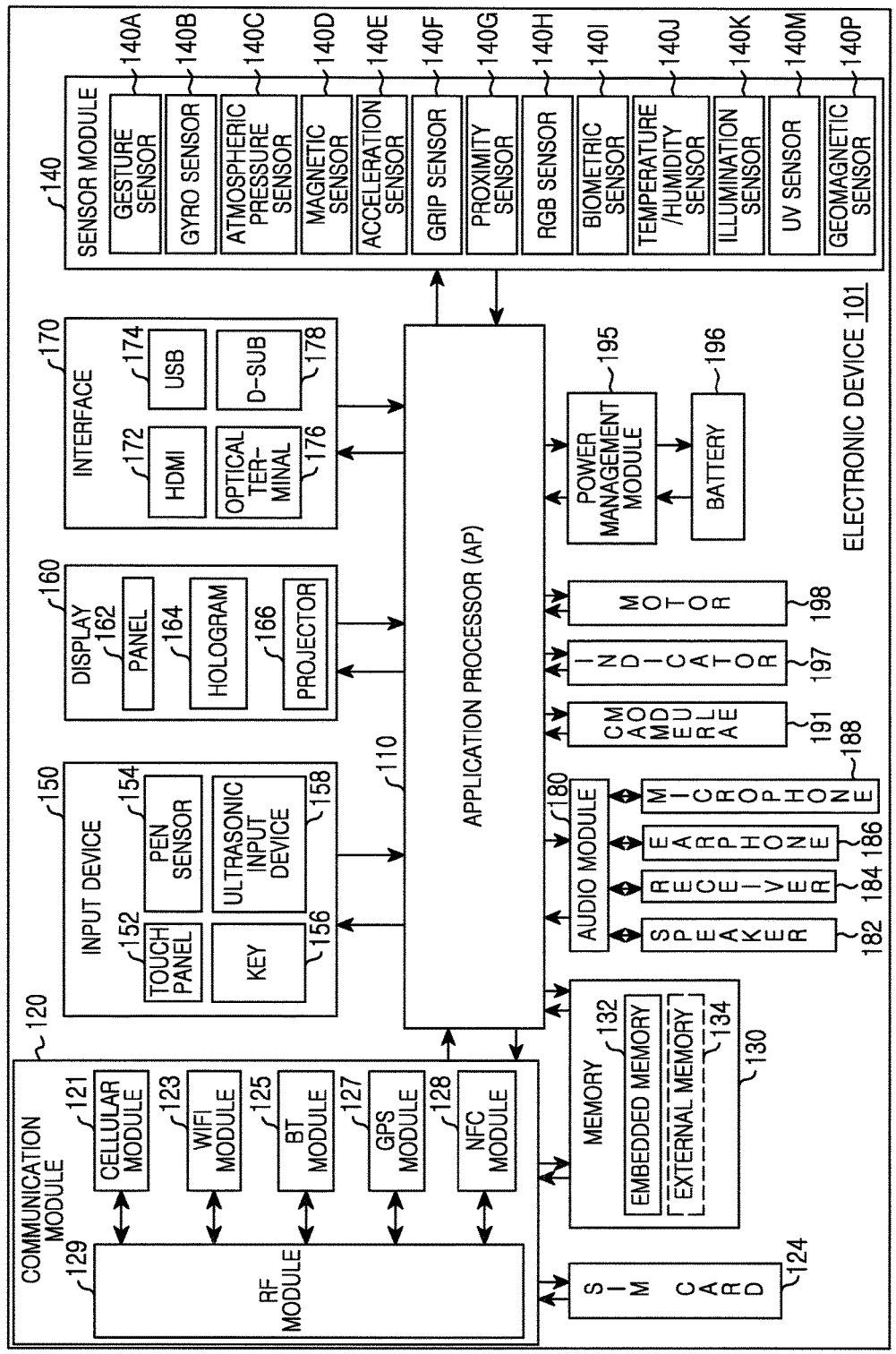
FIG. 1 is a block diagram of an example electronic device according to this disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device and communication system.

The present disclosure may have various embodiments, and modifications and changes may be made therein. Therefore, the present disclosure will be described in detail with reference to particular embodiments shown in the accompanying drawings. However, it should be understood that the present disclosure is not limited to the specific embodiments, but the present disclosure includes all modifications, equivalents, and alternatives within the spirit and the scope of the present disclosure. In describing the drawings, similar reference numerals may be used to designate similar constituent elements.

As used herein, the expression "include" or "may include" refers to the existence of a corresponding function, operation, or element, and does not exclude one or more additional functions, operations, or elements. Further, as used in various embodiments of the present disclosure, the terms "include", "have" and their conjugates may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Further, as used in various embodiments of the present disclosure, the expression "or" includes any or all combinations of words enumerated together. For example, the expression "A or B" may include A, may include B, or may include both A and B.

As used in various embodiments of the present disclosure, the expressions "first", "second", and the like may modify various elements in the present disclosure, but do not limit the sequence and/or importance of corresponding elements. The above expressions may be used merely for the purpose of distinguishing one element from the other elements.

When an element is referred to as being "coupled" or "connected" to any other element, it should be understood that not only the element may be coupled or connected directly to the other element, but also a third element may be interposed therebetween. Contrarily, when a element is referred to as being "directly coupled" or "directly connected" to any other element, it should be understood that no element is interposed therebetween.

The terms as used in various embodiments of the present disclosure are merely for the purpose of describing particular embodiments and are not intended to limit the present disclosure. As used herein, singular forms may include plural forms as well unless the context explicitly indicates otherwise. Further, all the terms used herein, including technical terms and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

An electronic device according to embodiments of the present disclosure includes a communication function. The electronic device according to various embodiments of the present disclosure includes, for example, at least one of a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, a wearable device (such as a head-mount-device (HMD) such as electronic glasses, electronic clothing, an electronic bracelet, an electronic necklace, an electronic appcessory, an electronic tattoo, or a smart watch), a television, a digital video disk (DVD) player, an audio, a refrigerator, an air conditioner, a vacuum cleaner, an oven, a microwave oven, a washing machine, an air cleaner, a set-top box, a TV box (such as SAMSUNG HOMESYNC™, APPLETV®, or GOOGLETV®), a game console, an artificial intelligence robot, a Television (TV), an electronic dictionary, an electronic key, a camcorder, medical equipment (such as a magnetic resonance angiography (MRA) machine, a magnetic resonance imaging (MRI) machine, a computed tomography (CT) scanner, or an ultrasonic machine), a navigation device, a global positioning system (GPS) receiver, an event data recorder (EDR), a flight data recorder (FDR), a vehicle infotainment device, electronic equipment for a ship (such as ship navigation equipment and a gyrocompass), avionics, security equipment, an industrial or home robot, a part of furniture or building/structure, an electronic board, an electronic signature receiving device, a projector, and various measuring instruments (such as a water meter, an electricity meter, a gas meter, or a wave meter), each of which includes a communication function. The electronic device according to various embodiments of the present disclosure is a combination of one or more of the aforementioned various devices. Further, it will be apparent to those skilled in the art that the electronic device according to various embodiments of the present disclosure is not limited to the aforementioned devices.

Hereinafter, an electronic device according to the various embodiments will be described with reference to the accompanying drawings. In various embodiments, the term "user" indicates a person using an electronic device or a device (e.g. an artificial intelligence electronic device) using an electronic device.

FIG. 1 illustrates an example electronic device according to this disclosure. Referring to FIG. 1, the electronic device 101 includes at least one processor 110, a communication module 120, a subscriber identification module (SIM) card 124, a memory 130, a sensor module 140, an input module 150, a display 160, an interface 170, an audio module 180, a camera module 191, a power management module 195, a battery 196, an indicator 197, and a motor 198. The display 160 can include circuitry for one or more of a panel 162, a hologram 164 or a projector 166. The interface 170 can include circuitry for interfaces comprising one or more of an HDMI 172, a universal serial bus (USB) 174, an optical terminal 176 or D-sub 178. The audio module 180 is coupled to one or more of a speaker 182, a receiver 184, an earphone 186 or a microphone 188.

At least one processor 110 is included in the electronic device 101 so as to perform predetermined functions of the electronic device 101. According to an embodiment of the present disclosure, the processor 110 includes at least one application processor (AP) and at least one micro controller unit (MCU). According to another embodiment of the present disclosure, the processor 110 includes at least one MCU as an application or is functionally connected to at least one MCU. Referring to FIG. 1, the AP and the MCU are incorporated into one integrated circuit (IC) package or can be separately included in different IC packages. According to an embodiment of the present disclosure, one IC package is implemented by including the MCU in the IC package of the AP. Although FIG. 1 shows the AP or MCU as being included as an element of the processor 110, this is merely an example and it will be apparent that the processor 110 serves as the AP and/or the MCU.

The AP controls a plurality of hardware or software components connected to the AP by driving an operating system or an application program and processes various data including multimedia data and perform calculations according to the data processing. The AP may, for example, be implemented as a system on chip (SoC). According to an embodiment of the present disclosure, the processor 110 further includes a graphic processing unit (GPU).

The MCU is a processor configured to perform predetermined operations. According to an embodiment of the present disclosure, the MCU acquires sensing information through at least one specified motion sensor (such as a gyro sensor 140B, an acceleration sensor 140E, or a geomagnetic sensor 140K, compares the acquired sensing information, and determines the operational state of the specified motion sensor (such as the gyro sensor 140B) by making reference to a database of the electronic device 101. In addition, although FIG. 1 shows the elements of the sensor module 140 as being separate from the MCU, the MCU is implemented to include at least some of the above elements of the sensor module 140 (such as at least one of the gyro sensor 140B, the acceleration sensor 140E, and the geomagnetic sensor 140P) according to an embodiment of the present disclosure.

According to an embodiment of the present disclosure, the AP or the MCU loads a command or data received from at least one of a non-volatile memory and other elements connected to each of the AP and the MCU into a volatile memory and processes the command or data loaded into the volatile memory. Further, the AP or the MCU stores data received from or generated by at least one of other elements in a non-volatile memory.

The communication module 120 transmits and receives data in communication between the electronic device 101 and any other external device connected thereto through a network. According to an embodiment of the present disclosure, the communication module 120 includes a cellular module 121, a Wi-Fi module 123, a BT module 125, a GPS module 127, an NFC module 128, and a radio frequency (RF) module 129.

The cellular module 121 provides a voice call, a video call, a short message service (SMS), or an Internet service through a communication network (such as LTE, LTE-A, CDMA, WCDMA, UMTS, WiBro, or GSM). Further, the cellular module 121 distinguishes between and authenticate electronic devices in a communication network using, for example, a SIM (such as the SIM card 124). According to an embodiment of the present disclosure, the cellular module 121 performs at least some of functions that are provided by the AP 110. The cellular module 121 performs, for example, at least some of multimedia control functions.

According to an embodiment of the present disclosure, the cellular module 121 includes a communication processor (CP). Further, the cellular module 121, for example, is implemented as an SoC. Although FIG. 1 shows the elements such as the cellular module 121 (such as CP), the memory 130, and the power management module 195 as being separate from the AP 110, the AP 110 is implemented to include at least some (such as the cellular module 121) of the above elements according to an embodiment of the present disclosure.

According to an embodiment of the present disclosure, the AP 110 or the cellular module 121 (such as CP) loads a command or data received from at least one of a non-volatile memory and any other element connected to each of the AP 110 and the cellular module 121 into a volatile memory and processes the command or data loaded into the volatile memory. Further, the AP 110 or the cellular module 121 stores data received from or generated by at least one other element in a non-volatile memory.

The Wi-Fi module 123, the BT module 125, the GPS module 127, or the NFC module 128 may, for example, include a processor for processing data transmitted and received through the corresponding module. Although FIG. 1 shows each of the cellular module 121, the Wi-Fi module 123, the BT module 125, the GPS module 127, and the NFC module 128 as being a separate block, at least some (such as two or more) of the cellular module 121, the Wi-Fi module 123, the BT module 125, the GPS module 127, and the NFC module 128 is included in one integrated chip (IC) or one IC package. For example, at least some of the processors corresponding respectively to the cellular module 121, the Wi-Fi module 123, the BT module 125, the GPS module 127, and the NFC module 128 (such as the CP corresponding to the cellular module 121 and the Wi-Fi processor corresponding to the Wi-Fi module 123) is implemented as one SoC.

The RF module 129 transmits and receives data, for example, RF signals. Although not shown in the drawing, the RF module 129 may, for example, include a transceiver, a power amp module (PAM), a frequency filter, a low noise amplifier (LNA), or the like. Further, the RF module 129 further includes a component for transmitting and receiving an electromagnetic wave in the free airspace in wireless communication, for example, a conductor or a conducting wire. Although FIG. 1 shows the cellular module 121, the Wi-Fi module 123, the BT module 125, the GPS module 127, and the NFC module 128 as sharing one RF module 129, at least one of the cellular module 121, the Wi-Fi module 123, the BT module 125, the GPS module 127, and the NFC module 128 transmits and receives an RF signal through a separate RF module according to an embodiment of the present disclosure.

The SIM card 124 is a card in which a SIM is implemented and is inserted into a slot formed in a predetermined position of the electronic device. The SIM card 124 includes unique identification information (such as an integrated circuit card identifier (ICCID)) or unique subscriber information (such as an international mobile subscriber identity (IMSI)).

The memory 130 (such as the memory 130) includes an internal memory 132 or an external memory 134. The internal memory 132 may, for example, include at least one of a volatile memory (such as a dynamic random access memory (DRAM), a static RAM (SRAM), or a synchronous DRAM (SDRAM)) and a non-volatile memory (such as a one-time programmable read only memory (OTPROM), a programmable ROM (PROM), an erasable and programmable ROM (EPROM), an electrically erasable and programmable ROM (EEPROM), a mask ROM, a flash ROM, a not and (NAND) flash memory, or a not or (NOR) flash memory).

According to an embodiment of the present disclosure, the internal memory 132 is a solid state drive (SSD). The external memory 134 further includes a flash drive, for example, a compact flash (CF), a secure digital (SD), a Micro-SD, a Mini-SD, an extreme digital (xD), a Memory Stick, or the like. The external memory 134 is functionally connected to the electronic device 101 through various interfaces. According to an embodiment of the present disclosure, the electronic device 101 further includes a storage device (or storage medium) such as a hard drive.

The sensor module 140 measures a physical quantity or senses an operational state of the electronic device 101 and converts the measured or sensed information to an electric signal. The sensor module 140 includes, for example, at least one of a gesture sensor 140A, the gyro sensor 140B, an atmospheric pressure sensor 140C, a magnetic sensor 140D, the acceleration sensor 140E, a grip sensor 140F, a proximity sensor 140G, a color sensor 140H (such as a red/green/blue (RGB) sensor), a biometric sensor 140I, a temperature/humidity sensor 140J, the geomagnetic sensor 140K, and an ultraviolet (UV) sensor 140M. Additionally or alternatively, the sensor module 140 may, for example, include an E-nose sensor, an electromyography (EMG) sensor, an electroencephalogram (EEG) sensor, an electrocardiogram (ECG) sensor, an Infrared (IR) sensor, an iris sensor, a fingerprint sensor, and the like. The sensor module 140 further includes a control circuit for controlling at least one sensor included therein.

The input module 150 includes a touch panel 152, a (digital) pen sensor 154, a key 156, or an ultrasonic input unit 158. The touch panel 152 that recognizes a touch input may, for example, include at least one of a capacitive touch panel, a resistive touch panel, an infrared touch panel, and an acoustic wave touch panel. The touch panel 152 further includes a control circuit. The capacitive touch panel is able to recognize physical contact or proximity. The touch panel 152 further includes a tactile layer. In this case, the touch panel 152 provides a tactile response to a user.

The battery gauge may, for example, measure the residual capacity, charge in voltage, current, or temperature of the battery. The battery 196 store or generate electricity and supplies power to the electronic device 101 using the stored or generated electricity. The battery 196 includes, for example, a rechargeable battery or a solar battery.

The indicator 197 displays a specific state of the electronic device 101 or a part thereof (such as the AP 110), for example, a boot-up state, a message state, or a state of charge (SOC). The motor 198 converts an electrical signal to a mechanical vibration. The electronic device 101 includes a processing unit (such as GPU) for supporting a mobile TV. The processing unit for supporting the mobile TV processes media data pursuant to a certain standard such as digital multimedia broadcasting (DMB), digital video broadcasting (DVB), or media flow.

Each of the above described elements of the electronic device according to various embodiments of the present disclosure includes one or more components, and the name of a corresponding element varies according to the type of electronic device. The electronic device according to various embodiments of the present disclosure includes at least one of the above described elements and can exclude some of the elements or can further include other additional elements. Further, some of the elements of the electronic device according to various embodiments of the present disclosure are coupled to form a single entity while performing the same functions as those of the corresponding elements before the coupling.

Figure 2:
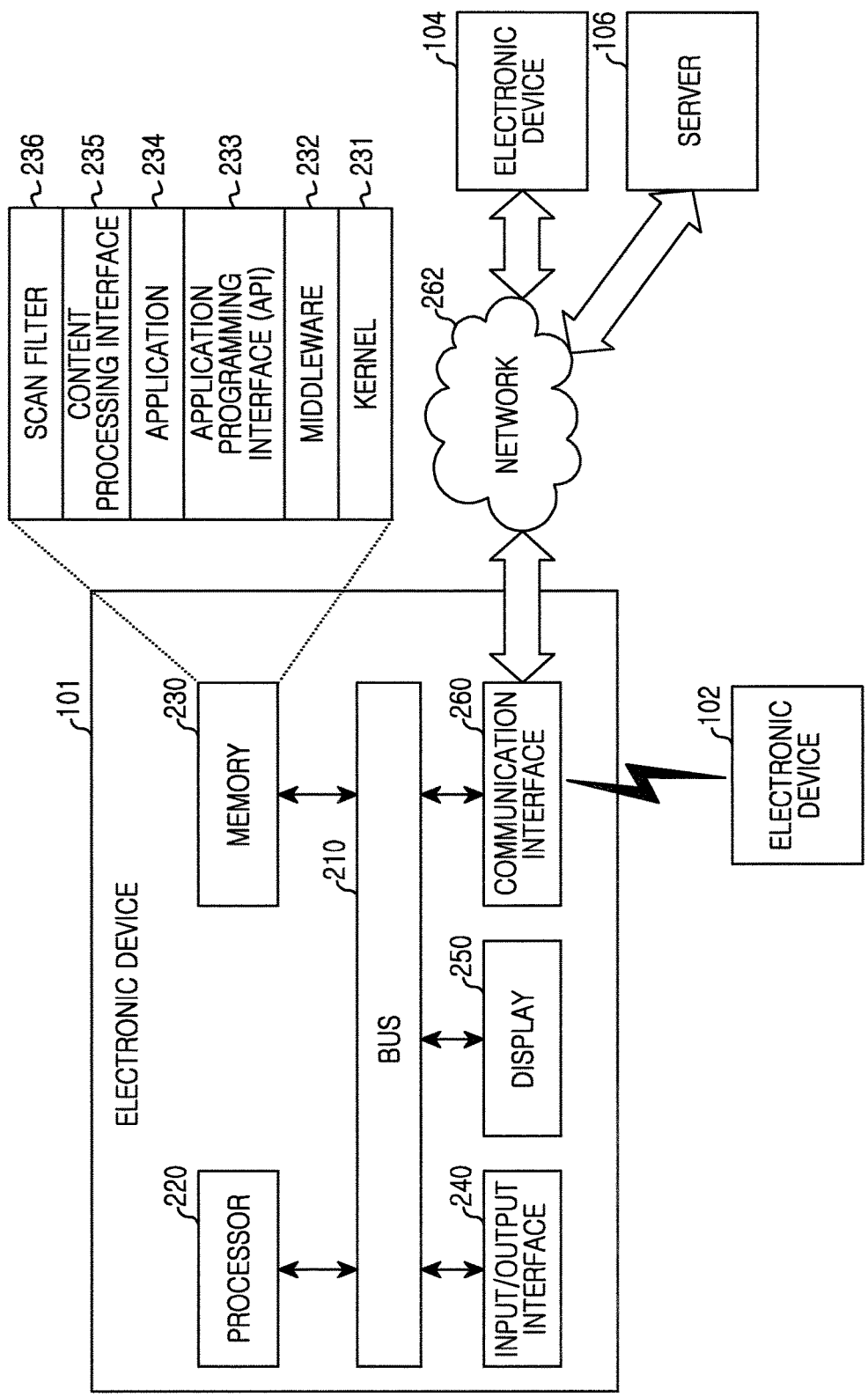
FIG. 2 illustrates an example network environment including an example electronic device according to this disclosure.

FIG. 2 illustrates an example network environment including an example electronic device according to this disclosure. An electronic device 101 includes a memory that stores a received content, a display that displays the content, and at least one processor 220 that executes a control to receive a designated content including information associated with a second server from a first server, to receive content identification information from the second server when the electronic device 101 is located in a wireless communication area of the second server, and to determine at least one information corresponding to the content identification information from the designated content. According to an embodiment of the present disclosure, the electronic device 101 displays the at least one information in the display or transmits the at least one information to provide the same in at least another device.

According to an embodiment of the present disclosure, the electronic device 101 determines, as the designated content, a content selected by a user from among contents provided by the first server or a content stored in setting information. According to an embodiment of the present disclosure, the electronic device 101 requests transmission of additional information from the first server, and receives the additional information from the first server so as to display the same in the display. According to an embodiment of the present disclosure, the electronic device 101 receives the designated content of a predetermined content provider from among various contents received from at least two content providers.

According to an embodiment of the present disclosure, the electronic device 101 determines the content identification information as identification information corresponding to a location of the second server of a content provider. According to an embodiment of the present disclosure, the electronic device 101 receives, as the designated content, a content updated in the first server after a content that is previously received in the electronic device. According to an embodiment of the present disclosure, the electronic device 101 compares an expiration date included in the at least one information and time information of the electronic device 101, so as to determine whether the expiration date expires, and requests the first server to check content updating executed after the at least one information when it is determined that the expiration date expires.

According to an embodiment of the present disclosure, the electronic device 101 executes a control to store at least one of a different content in a category identical or similar to the designated content provided by the content provider corresponding to the second server, a designated recommend content near the second server, a content associated with another event provided by the second server, and a content provided from another point of the content provider, in a database as the information associated with the second information. According to an embodiment of the present disclosure, the electronic device 101 filters the designated content based on setting information included in the electronic device. According to an embodiment of the present disclosure, the electronic device 101 determines, as the at least one information, a part of the designated content, which is included in a result obtained through filtering based on the setting information. According to an embodiment of the present disclosure, the electronic device 101 receives the content including two or more content identification information of which a sequence is designated.

According to an embodiment of the present disclosure, the electronic device 101 displays at least one of the content corresponding to content identification information having a priority subsequent to the content identification information of the second server. According to an embodiment of the present disclosure, the electronic device 101 determines, as the content, at least one of an instruction that controls a device, a password, device identification information of the electronic device. According to an embodiment of the present disclosure, the electronic device 101 transmits, to the second server, the password or instruction of the content corresponding to the content identification information received from the second server, and the second server executes a designated operation based on the received instruction or password.

According to an embodiment of the present disclosure, the electronic device 101 transmits the at least one information of the content processed based on the state information of the other device. According to an embodiment of the present disclosure, the electronic device 101 transmits a content that is processed to be provided in at least another device and is received from the first server, or a content that is processed in the electronic device. According to an embodiment of the present disclosure, the electronic device 101 receives content identification information from a third server, determine a distance to the second server or the third server, and display or transmit at least one of a content corresponding to content identification information of a server that is determined to be in a close distance.

The electronic device 101 forms, for example, a part or the entirety of the electronic device 101 illustrated in FIG. 1. Referring to FIG. 2, the electronic device 101 include a bus 210, a processor 220, a memory 230, an input/output interface 240, a display 250, and a communication interface 260. The bus 210 is a circuit that interconnects the above-described component elements and delivers communication signals (for example, a control message) between the above-described component elements. The processor 220 receives, for example, instructions from other component elements (for example, the memory 230, the user input/output interface 240, the display 250, and the communication interface 260) through the bus 210, analyzes the received commands, and executes calculation or data processing according to the analyzed commands.

The processor 220 executes a control to receive, from a first server, a designated content including information associated with a second server, to receive content identification information (for example, location identification information, content identification information and/or device identification information) from the second server when the electronic device is located in the wireless communication area of the second server, and to determine at least one information corresponding to the content identification information from the designated content.

The processor 220 displays the at least one information or to transmit the at least one information to provide the same in at least another device. The processor 220 determines, as the designated content, a content selected by a user from among contents provided by the first server, or a content stored in setting information. The processor 220 executes a control to request transmission of additional information from the first server, and to receive the additional information from the first server so as to display the same in the display. The processor 220 executes a control to receive a designated content of a predetermined content provider from among various contents received from at least two content providers. The processor 220 determines the content identification information as point identification information corresponding to a location of the second server of a content provider. The processor 220 executes a control to determine, as a designated content, a content updated in the first server after a content that is previously received in the electronic device. The processor 220 executes a control to compare an expiration date included in the at least one information and time information of the electronic device, so as to determine whether the expiration date expires, and to request the first server to check content updating executed after the at least one information when it is determined that the expiration date expires. The processor 220 executes a control to store at least one of a different content in a category identical or similar to the designated content provided by the content provider corresponding to the second server, a designated recommend content near the second server, a content associated with another event provided by the second server, and a content provided from another point of the content provider, in a database as the information associated with the second information. The processor 220 executes a control to filter the designated content based on the setting information included in the electronic device. The processor 220 executes a control to determine, as at least one information, a part of the designated content, which is included in a result obtained after filtering based on the setting information. The processor 220 receives a content including two or more content identification information of which a sequence is designated. The processor 220 displays at least one of a content corresponding to content identification information having a priority subsequent to content identification information of the second server. The processor 220 determines, as a content, at least one of an instruction that controls a device, a password, and device identification information of the electronic device. The processor 220 transmits, to the second server, a password or an instruction of a content corresponding to content identification information received from the second server, and the second server executes a designated operation based on the received instruction or password. The processor 220 transmits at least one of a content processed based on state information of another device. The processor 220 transmits a content that is processed to be provided in at least another device and is received from the first server, or a content that is processed in the electronic device. The processor 220 receives content identification information from a third server, determines a distance to the second server or the third server, and display or transmit at least one of a content corresponding to content identification information of a server that is determined to be in a close distance. Various embodiments of the present disclosure are implemented by the processor 220 generally included in the electronic device 101 or are implemented by independently forming a module (for example, a microcontroller unit (MCU)) for implementing the various embodiments of the present disclosure. Alternatively, the MCU implements the various embodiments based on a control of the processor 220.

The memory 230 stores an instruction or data received from the processor 220 or other component elements (for example, the input/output interface 240, the display 250, the communication interface 260), or stores a command or data generated by the processor 220 or other component elements. The memory 230 includes programming modules (or programs), for example, a kernel 231, middleware 232, an Application Programming Interface (API) 233, an application 234, a content processing interface 235, a scan filter 236, and the like. The above described programming modules are formed of software, firmware, and hardware, or a combination of at least two thereof. The kernel 231 controls or manages system resources (for example, the bus 210, the processor 220, the memory 230, or the like) used for executing operations or functions implemented in other programming modules, for example, the middleware 232, the API 233, or the application 234. Also, the kernel 231 provides an interface so that the middleware 232, the API 233, or the application 234 accesses each component element of the electronic device 101 and executes controlling or managing.

The middleware 232 acts as an intermediary which allows the API 233 or the application 234 to communicate with and exchange data with the kernel 231. Also, in association with task requests received from the application 234, the middleware 232 executes a control (for example, scheduling or load balancing) for a task request, through use of a method of assigning, to at least one of applications 234, a priority for using a system resource of the electronic device 101 (for example, the bus 210, the processor 220, the memory 230, or the like).

The API 233 is an interface used by the application 234 to control a function provided from the kernel 231 or the middle ware 232, and includes, for example, at least one interface or function (for example, an instruction) for a file control, a window control, image processing, a character control, or the like.

The application 234 is an application that is associated with exchanging information between the electronic device 101 and an external electronic device (for example, the electronic device 102 or the electronic device 104). The application related to information exchanging includes, for example, a notification relay application for transferring predetermined information to an external electronic device or a device management application for managing an external electronic device. According to various embodiments of the present disclosure, the application 234 includes an application additionally designated based on properties (for example, a type of an electronic device) of an external electronic device (for example, the electronic device 102 or the electronic device 104).

The content processing interface 235 includes a programming module that executes a control to receive a designated content including information associated with a predetermined location from a first server that provides a content, to receive content identification information from a second server when an electronic device is located in a wireless communication area of the second server that transmits location information of the predetermined location, and to display, in a display, at least one information corresponding to the content identification information from the designated content. Although it is illustrated that the content processing interface 235 is included in the memory 230 as an independent application, this expresses a programming module for clear description of various embodiments of the present disclosure and the content processing interface 235 is included in a category of the application 234.

The scan filter 236 is a filter to determine whether to process a content corresponding to identification information at a point in time when the electronic device 101 receives the identification information through the communication interface 260, or to determine whether a predetermined authority is set for the content at a point in time designated after the reception of the content. The scan filter 236 is provided by including a list associated with content identification information transmitted by a device. When the scan filter 236 includes at least one identification information, the scan filter 236 includes information associated with whether the electronic device 101 receives or processes each piece of identification information. In association with the information associated with whether the electronic device 101 receives or processes each piece of identification information, the scan filter 236 provides the information based on a white list scheme (for example, a list formed of devices or contents corresponding to allowed, authorized, approved identification information), a black list scheme (for example, a list formed of devices or contents corresponding to disallowed, unauthorized, disapproved identification information), or a combination of the white list scheme and the black list scheme. Hereinafter, a state that satisfies a predetermined condition such as allowed, authorized, or approved state is referred to as an "approved" state, and a state that fails to satisfy a predetermined condition such as disallowed, unauthorized, or disapproved state is referred to as a "disapproved" state.

The input/output interface 240 transfers an instruction or data input by a user through a sensor (for example, an acceleration sensor or a gyro sensor) or an input device (for example, a keyboard or a touch screen) to the processor 220, the memory 230, the communication interface 260, for example, through the bus 210. For example, the input/output interface 240 provides the processor 220 with data corresponding to a touch of a user received as input through a touch screen. The input/output interface 240 outputs, to an output device (for example, a speaker or a display), an instruction or data received from the processor 220, the memory 230, or the communication interface 260, for example, through the bus 210. For example, the input/output interface 240 outputs voice data processed by the processor 220 to a user through a speaker.

The display 250 displays various pieces of information (for example, multimedia data or text data) to a user. In addition, the display 250 is embodied as a touch screen through which an instruction is input by touching or proximity touching a display with an input unit.

The communication interface 260 (for example, the communication module 120) connects communication between the electronic device 101 and an external electronic device (for example, the electronic device 104 or the server 106). For example, the communication interface 260 is connected to the network 262 through wireless communication or wired communication, and communicates with an external device. The wireless communication includes at least one of, for example, Wi-Fi, BLUETOOTH® (BT), Near Field Communication (NFC), Global Positioning System (GPS) and cellular communication (for example, LTE, LTE-A, CDMA, WCDMA, UMTS, WiBro, GSM, and the like). The wired communication includes at least one of, for example, a Universal Serial Bus (USB), a High Definition Multimedia Interface (HDMI), a Recommended Standard 232 (RS-232), and a Plain Old Telephone Service (POTS). The communication interface 260 (for example, the communication module 120) is a processor which is different from an AP, and executes an operation of connection communication between the electronic device 101 and an external device (for example, the electronic device 104 or the server 106), and is included in the electronic device 101.

Alternatively, the communication interface 260 executes an operation of connecting communication between the electronic device 101 and an external device (for example, the electronic device 104 or the server 106) through an independent processor (for example, a communication processor). According to an embodiment of the present disclosure, the network 262 is a telecommunications network. The communication network includes at least one of a computer network, the Internet, the Internet of things, or a telephone network. According to an embodiment of the present disclosure, a protocol (for example, a transport layer protocol, a data link layer protocol, or a physical layer protocol) for communication between the electronic device 101 and an external device is supported by at least one of the application 234, the application programming interface 233, the middleware 232, the kernel 231, and the communication interface 260.

Figure 3A:
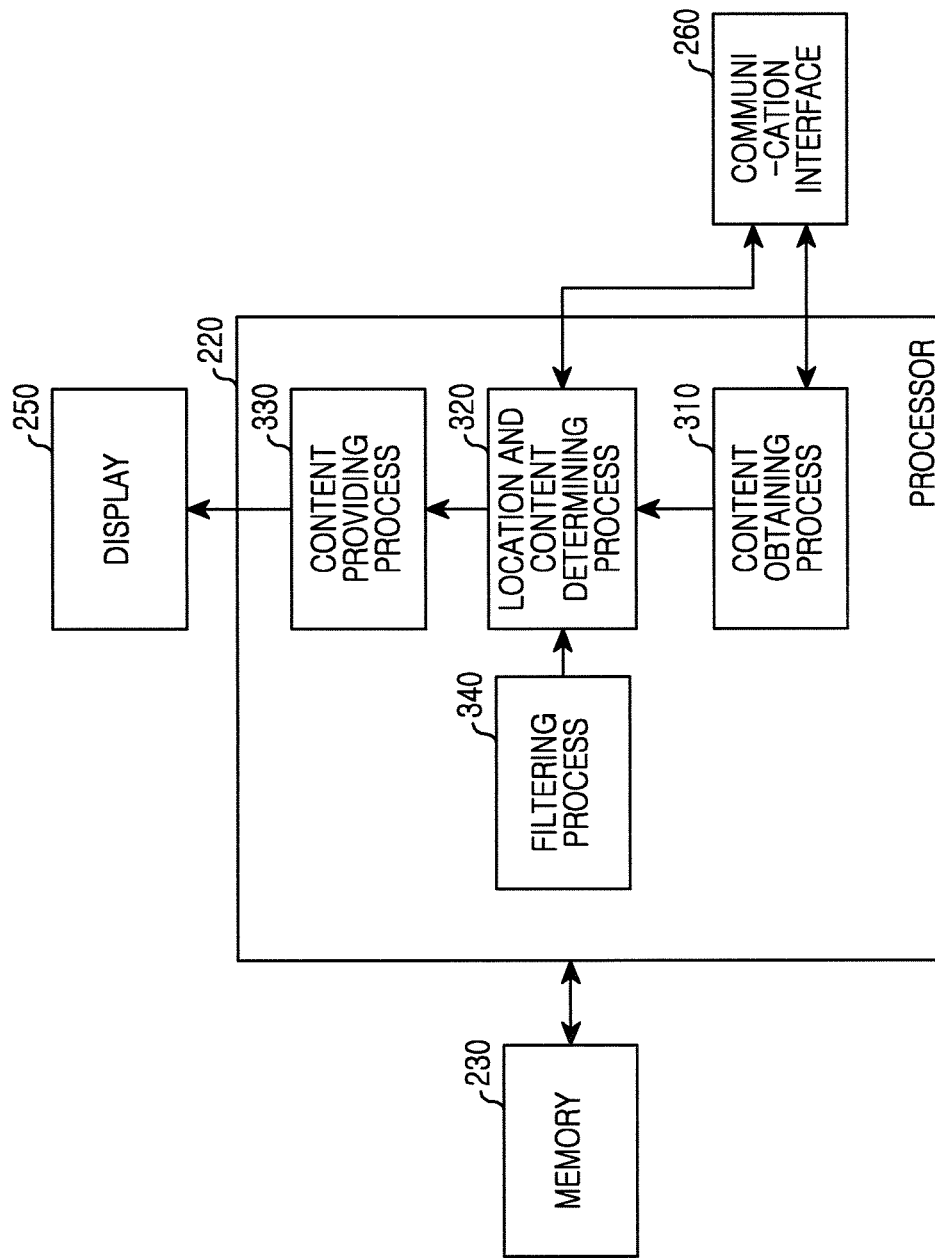
FIGS. 3A and 3B illustrate an example method using an electronic device according to this disclosure.
Figure 3B:
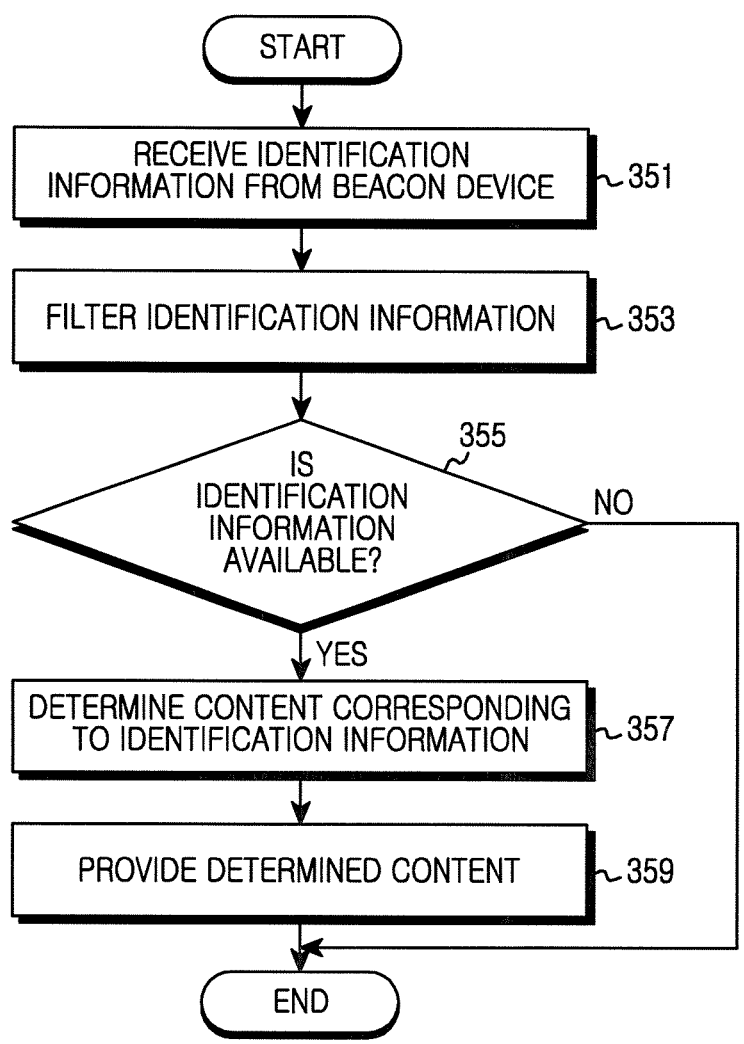

FIGS. 3A and 3B illustrate an example content processing method of the processor 220 in an electronic device according to this disclosure. Hereinafter, various embodiments of the present disclosure will be described with reference to FIG. 3A. The processor 220 executes at least one of a content obtaining process 310, a location and content determining process 320, a content providing process 330, and a filtering process 340. The processor 220 executes a control to transmit and receive data (for example, a content or or location information of the electronic device 101) to/from another electronic device through the communication interface 260. The processor 220 obtains stored data such as a content, from the memory 230, and obtains a content received from the communication interface 260. The processor 220 executes a control to determine a location of the electronic device 101 based on the data (for example, data including location information) received through the communication interface 260, or to determine a location of the electronic device 101 through a location determining interface (for example, the GPS module 127) included in the electronic device 101. The processor 220 executes a control to display, in the display 250, a content that is determined to be provided in the electronic device 101.

In the content obtaining process 310, the processor 220 receives a content from at least one content provider. In the content obtaining process 310, the processor 220 stores the received content in a database for each content provider. In the content obtaining process 310, the processor 220 receives a request for a designated content from at least another electronic device (for example, the electronic device 102). In the content obtaining process 310, the processor 220 receives, from at least another electronic device (for example, the electronic device 102), setting information including user information of the electronic device 102 and information associated with a content of which reception is requested. In the content obtaining process 310, the processor 220 obtains a content that matches received content identification information, from the database of the electronic device 101.

In the location and content determining process 320, the processor 220 determines a push list including information associated with a target electronic device to which a designate content received from a content provider or a notification associated with the content is to be transmitted, based on the setting information received from at least another electronic device. In the location and content determining process 320, when a content is received from a content provider, the processor 220 determines at least another electronic device (for example, the electronic device 102) to which the content received from the content provider or a notification associated with the content is to be transmitted, based on the push list. In the location and content determining process 320, the processor 220 filters at least one content received from the server 106, based on the setting information. In the location and content determining process 320, the processor 220 determines a content corresponding to content identification information received from a device (for example, a communication relay device identification information transmitting device, a beacon, or a beacon device, hereinafter referred to as a beacon device) that transmits identification information (for example, device identification information or location identification information), based on the content received from the server 106.

In the content providing process 330, the processor 220 provides the content that matches the received content identification information through the display 250. In the content providing process 330, the processor 220 requests additional related information from the server 106, when providing the content matching the received content identification information. In the content providing process 330, the processor 220 requests the server 106 to check updating of the corresponding content when the content matching the received content identification information is not determined from the database of the electronic device 101. In the content providing process 330, when the content is received from a content provider, the processor 220 transmits, with reference to the database, the received content or a notification message associated with the content to another electronic device (for example, the electronic device 102) that requests reception of the received content of the content provider. In the content providing process 330, when the processor 220 is requested to transmit a designated content by the electronic device 102 or is requested to transmit a content of a designated content provider, the processor 220 transmits a corresponding content to the electronic device 102.

The filtering process 340 determines whether to process a content corresponding to identification information (for example, device identification information) at a point in time when the electronic device 101 receives identification information through the interface 260, or a method of processing (for example, deleting, storing, changing a category, or the like) a content stored in the memory 230 at a designated point in time. The filtering process 340 is executed based on the scan filter 236 stored in the memory 230 of the electronic device 101. The processor 220 receives device identification information of a beacon device and/or location identification information corresponding to a location of a beacon device, at a point in time of detecting that a device (for example, a beacon device) that transmits identification information transmits identification information.

The filtering process 340 is executed at a point in time of receiving identification information through the communication interface 260. According to an embodiment of the present disclosure, when the processor 220 determines device identification information of a beacon device and the device identification information of the beacon device determined based on the scan filter 236, is approved information, the processor 220 provides a content corresponding to the device identification information transmitted by the beacon device in the electronic device 101. Here, when the processor 220 determines, using the scan filter 236, that the beacon device is different from a device that is set to process a content corresponding to the device identification information, the processor 220 disregards device identification information transmitted by the beacon device. According to an embodiment of the present disclosure, the processor 220 determines subordinate content identification information associated with at least one of various subordinate contents (here, a content indicates at least a part of a content) provided by a content provider of a beacon device, and when subordinate content identification information determined based on the scan filter 236 is information of which provision in the electronic device 101 is approved, the processor 220 provides, in the electronic device 101, a subordinate content corresponding to the subordinate content identification information transmitted by the beacon device. Here, the processor 220 selectively provides, based on the scan filter 236, a subordinate content corresponding to subordinate content identification information that is set to be provided among subordinate content identification information received from the beacon device.

The filtering process 340 is executed at a point in time of processing a content stored in the memory 230. According to an embodiment of the present disclosure, a point in time when the processor 220 processes a content stored in the memory 230 is a point in time of providing a designated content, in response to a user input, a point in time of calling a content corresponding to received identification information, or a point in time of resetting a content stored in the memory 230 based on a user input or setting information. According to an embodiment of the present disclosure, resetting of a content is filtering a content that corresponds to a subordinate content identification information that is determined to not be provided (or to be provided) in the electronic device 101 as setting is changed based on a user input, or that corresponds to device identification information transmitted by a beacon device. In the filtering process 340, the processor 220 deletes a content that is determined to not be processed, from the memory 230, or includes the content in a designated category (for example, a category corresponding to 'not used content').

As illustrated in FIG. 3A, the processor 220 executes various embodiments of the present disclosure. The operations executed by the processor 220 are controlling at least one interface (or module) by being functionally connected with various interfaces (or modules) forming the electronic device 101, or are processing data so as to enable at least one interface (or module) to execute a designated function. Unless otherwise noted, the operations executed by the processor 220 includes controlling at least one of the electronic device 101 or processing data included in the memory 230. In addition, in the descriptions provided herein, it is illustrated that the electronic device 101 executes various embodiments of the present disclosure executed by the processor 220.

Hereinafter, various embodiments of the present disclosure will be described with reference to FIG. 3B. In operation 351, the electronic device 101 receives content identification information from a beacon device. The electronic device 101 obtains content identification information based on a period designated in the setting information of the electronic device 101, or by receiving at least one signal detected through the communication interface 260 of the electronic device 101 at a point in time selected by a user.

In operation 353, the electronic device 101 filters content identification information included in the received signal. The electronic device 101 executes filtering the content identification information based on the scan filter 236. According to an embodiment of the present disclosure, the electronic device 101 determines whether the received content identification information is approved information or not, based on the scan filter 236. For example, the approved content identification information that is designated in the scan filter 236, is content identification information set through a user input or content identification information associated with data that is appointed to be transmitted or received through the communication interface 260 of the electronic device 101, and is, for example, device identification information associated with a counterpart device that is paired at least one time through radio communication, such as BLUETOOTH® communication or NFC communication, device identification information of a beacon device designated based on a user input, or location identification information designated based on a location of a beacon device.

In operation 355, the electronic device 101 determines whether the content identification information is content identification information that is set as approved information in the scan filter 236 (for example, whether the identification information is available). The electronic device 101 executes operation 357 when the content identification information is approved content identification information, and terminates the embodiment of FIG. 3B when the content identification information is not approved content identification information.

In operation 357, the electronic device 101 determines a content corresponding to the content identification information. According to an embodiment of the present disclosure, the electronic device 101 includes at least one content provided by a content provider designated in the memory 230 or a data base, and predetermined content identification information is set in each content. The electronic device 101 determines a content corresponding to the content identification information with reference to a data base based on the received content identification information.

In operation 359, the electronic device 101 provides the determined content. The electronic device 101 provides a content determined based on state information of the electronic device 101. The state information of the electronic device 101 is information indicating whether an output device, such as the display 250 and the speaker 182, exists, size information of the display 250, and information indicating whether a device that is connected to the electronic device 101 through the communication interface 260 exists. According to an embodiment of the present disclosure, the electronic device 101 displays an image of the determined content through the display 250, output an audio of the content through the speaker 182, and transmit the corresponding content to provide the same through a device that is connected with the electronic device 101 through the communication interface 260. The electronic device 101 terminates the embodiment of FIG. 3B, after executing operation 359.

Figure 4A:
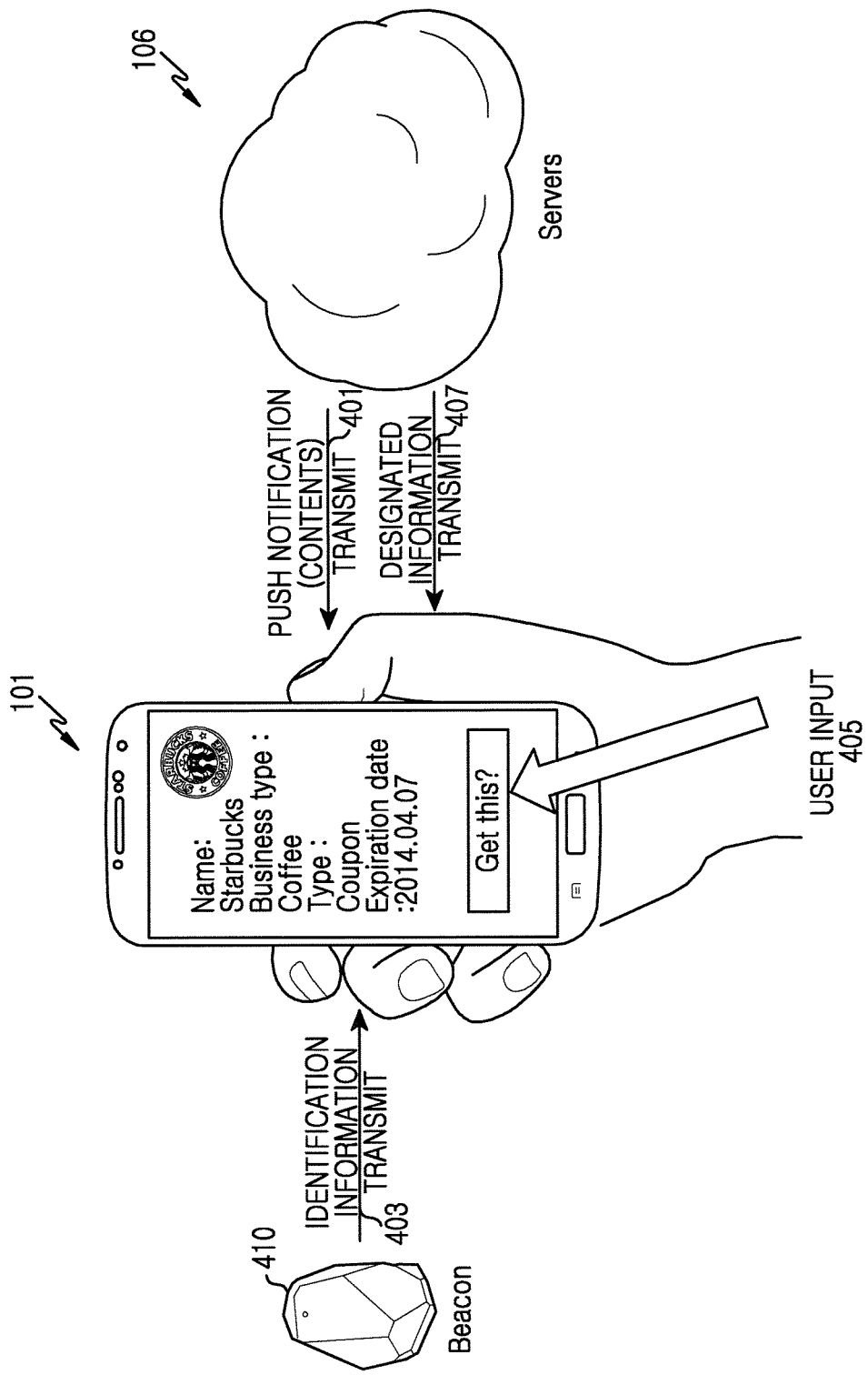
FIGS. 4A and 4B illustrate an example method using an electronic device for transmitting or receiving a content with another electronic device according to this disclosure.
Figure 4B:
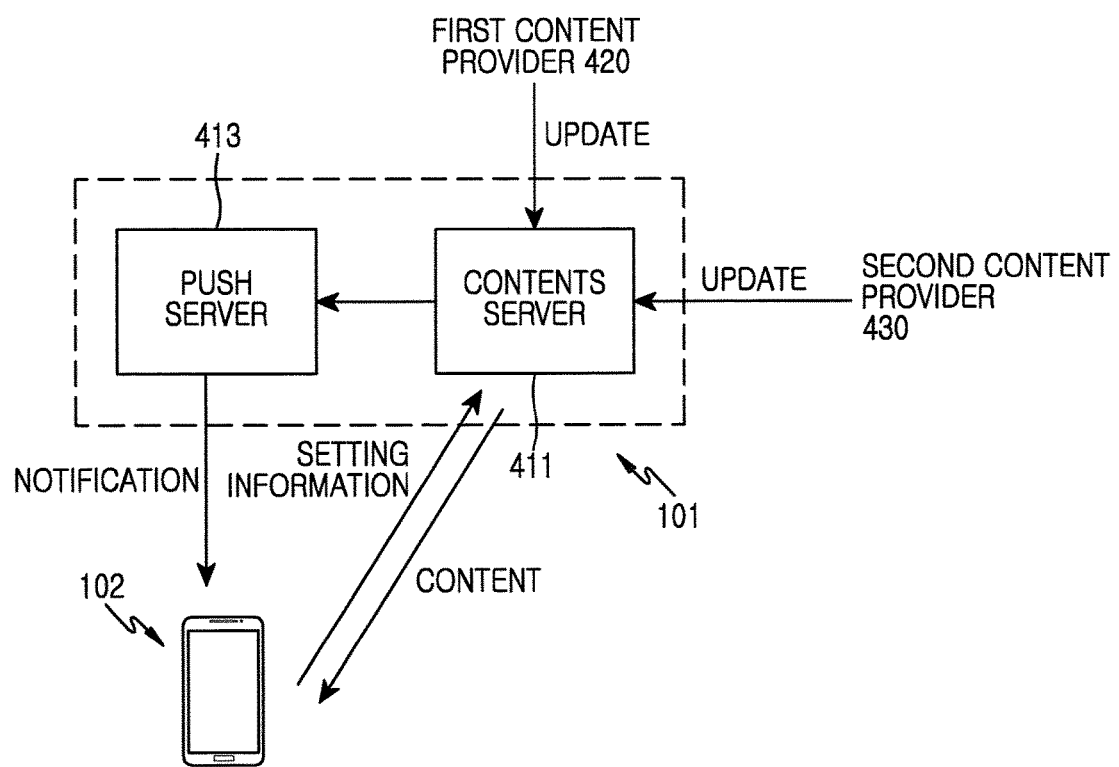

FIGS. 4A and 4B illustrate a method using an electronic device for transmitting or receiving a content according to this disclosure. Hereinafter, various embodiments of the present disclosure will be described with reference to FIG. 4A. The electronic device 101 receives, from the server 106, a notification message for a content provided (or updated) by a content provider. The electronic device 101 receives at least one content based on the notification of the content. In connection with the reception of a content, the electronic device 101 receives, from the server 106, a designated content based on setting information stored in advance or a user input. According to an embodiment of the present disclosure, the electronic device 101 selects at least one content from among contents provided by two or more content providers, and receive the same from the server 106. A content provided by a content provider is formed of at least one subordinate content, and a content is received based on a content unit or based on a subordinate content unit that forms a content, based on the setting information of the electronic device 101. The electronic device 101 receives content identification information from a beacon device 410, and determines a content corresponding to the received content identification information. According to an embodiment of the present disclosure, the electronic device 101 receives, from the server 106, at least one of contents (for example, a coupon) provided by a content provider of STARBUCKS®. The electronic device 101 selects and receive a content (for example, a subordinate content) provided by a designated branch from among contents provided by the content provider of STARBUCKS®. The electronic device 101 stores device identification information or location identification information corresponding to the received content, in a database of the electronic device 101. The electronic device 101 receives the content identification information from at least one beacon device 410. The electronic device 101 searches for data matching the received content identification information from the database, and determines a content provided by a branch of STARBUCKS® corresponding to the content identification information. The electronic device 101 provides information associated with a content, based on state information of the content. According to an embodiment of the present disclosure, when providing a coupon of STARBUCKS® corresponding to the content identification information, the electronic device 101 compares an expiration date of a coupon with time information of the electronic device 101 and excludes an expired coupon from the contents to be provided. Alternatively, the electronic device 101 organizes coupons in order of long expiration date based on time information of the electronic device 101 and provide the coupons.

When the electronic device 101 detects a user input 405 based on a provided coupon, the electronic device 101 obtains or provide additional data based on the input. According to an embodiment of the present discourse, the electronic device 101 displays, in the display 250, a coupon of a branch corresponding to the content identification information of a beacon device, provided by the content provider of STARBUCKS®. The electronic device 101 detects an input for determining detailed information of the provided coupon, and provides at least one detailed information associated with the provided coupon in response to the input. According to an embodiment of the present disclosure, the electronic device 101 provides information retrieved from a content stored in the database, and receives designated information 407 from the server 106 and provide the same. According to an embodiment of the present disclosure, the electronic device 101 provides a content received from the server 106 when the corresponding content is received from the server 106 at a point in time when the input for determining detailed information is detected, and when the electronic device 101 fails to receive the corresponding content from the server 106, the electronic device 101 determines a designated content from a database and provides the same. Here, the designated content is a coupon having a long expiration date based on the time information of the electronic device 101.

Hereinafter, various embodiments of the present disclosure will be described with reference to FIG. 4B. Referring to FIG. 4B, the electronic device 101 (or first electronic device 101) obtains a designated content from a content provider, and executes functions of a server (for example, the server 106) that transmits a designated content to at least another electronic device (for example, the electronic device 102 or second electronic device 104). According to an embodiment of the present disclosure, the first electronic device 101 includes a content server 411 that receives at least one content from the outside, and a push server 413 that transmits a received content.

The content server 411 receives a content from at least one content provider (for example, a first content provider 420). When the content server 411 receives different contents from two or more content providers (for example, the first content provider 420 and a second content provider 430), the content server 411 stores information associated with contents received from the content providers in the database of the first electronic device 101, for each content provider. When the content server 411 determines that a received content is a content (for example, a second content) different from an existing content (for example, a first content) received from the first content provider 420, the content server 411 executes processing to enable the push server 413 to transmit a notification message associated with the second content to at least another electronic device that is set to receive a content of the first content provider 420 based on the database of the first electronic device 101. The content server 411 is requested to transmit a corresponding content by another electronic device (for example, the second electronic device 102) that receives the notification message transmitted by the push server 413. The content server 411 transmits the requested content to the second electronic device 102, and transmits a content associated with the requested content based on the data base, in addition to transmission of the requested content.

The push server 413 transmits, to another designated electronic device (for example, the second electronic device 102), a notification message associated with a content received from the content provider based on the data base included in the electronic device 101. According to an embodiment of the present disclosure, when it is determined that a designated content (the second content) is updated in the content server 411, the push server 413 determines another electronic device (for example, the second electronic device 102) that is set (registered) to receive a content of the first content provider 420 obtained through updating the second content, based on the database (for example, a list of receivers registered in the database) of the first electronic device 101. The push server 413 transmits a notification message associated with the second content to the second electronic device 102 determined based on the database. When the push server 413 transmits the second content, the push server 413 transmits at least one of data corresponding to the second content, a notification message associated with the second content, and a notification message for at least another content associated with the second content.

According to the above described descriptions, referring to FIG. 4B, although it is illustrated that the first electronic device 101 includes the push server 413 and the content server 411 which are configured separately, it is merely an example to clearly describe the embodiment of the present disclosure, and the first electronic device 101 is integrated with the push server 413 and the content server 411 as a single device. It is apparent that the first electronic device 101 is capable of executing the operations of the content server 411 and/or the push server 413. The operations of the content server 411 or the push server 413, that are not particularly mentioned, will be described through the operations of the first electronic device 101.

According to another embodiment of the present disclosure, the first electronic device 101 transmits, to the second electronic device 102, a content designated based on data (for example, a wish list) received from the second electronic device 102 connected through network communication. According to an embodiment of the present disclosure, the electronic device 101 obtains information associated with a request for transmission of a content of the first content provider 420 and a content of the second content provider 430 from the wish list received from the second electronic device 102. When the first content provider 420 or the second content provider 430 updates a content, the first electronic device 101 stores, in the database of the first electronic device 101, information that executes processing to transmit a notification message associated with the updated content to the second electronic device 102. When it is determined that a content is updated by the first content provider 420 or the second content provider 430, the electronic device 101 transmits a notification message associated with the updated content to the second electronic device 102. When the first electronic device 101 receives a request for transmission of a content from the second electronic device 102 to which the notification message is transmitted, the first electronic device 101 transmits a designated content to the second electronic device 102.

FIGS. 5A, 5B, 5C, and 5D illustrate an example method of receiving and/or outputting a content using an electronic device according to this disclosure. The electronic device 101 obtains content identification information (for example, location identification information or user identification information) that determines a content to be output based on a designated place, and outputs the content corresponding to the identification information. According to an embodiment of the present disclosure where location identification information corresponding to a designated place is obtained, the electronic device 101 receives location identification information from a transmitting device (for example, a communication relay device, a beacon, or a beacon device, hereinafter referred to as a beacon device 510 in FIGS. 5A and 5B) of identification information (for example, device identification information, location identification information, or content identification information), which is connected through designated network communication (for example, wireless communication such as Wifi communication, BLUETOOTH® communication, NFC communication or the like). According to an embodiment of the present disclosure, the electronic device 101 is located in a data transmission range of the beacon device 510 that transmits location identification information through designated network communication (for example, NFC communication) at time intervals designated in the data transmission range of NFC communication. The electronic device 101 receives location identification information from the beacon device 510 when a condition of transmitting and receiving data to/from a beacon device through NFC communication (for example, a state in which the electronic device 101 and the beacon device 510 are connected through NFC communication) is satisfied.

Figure 5A:
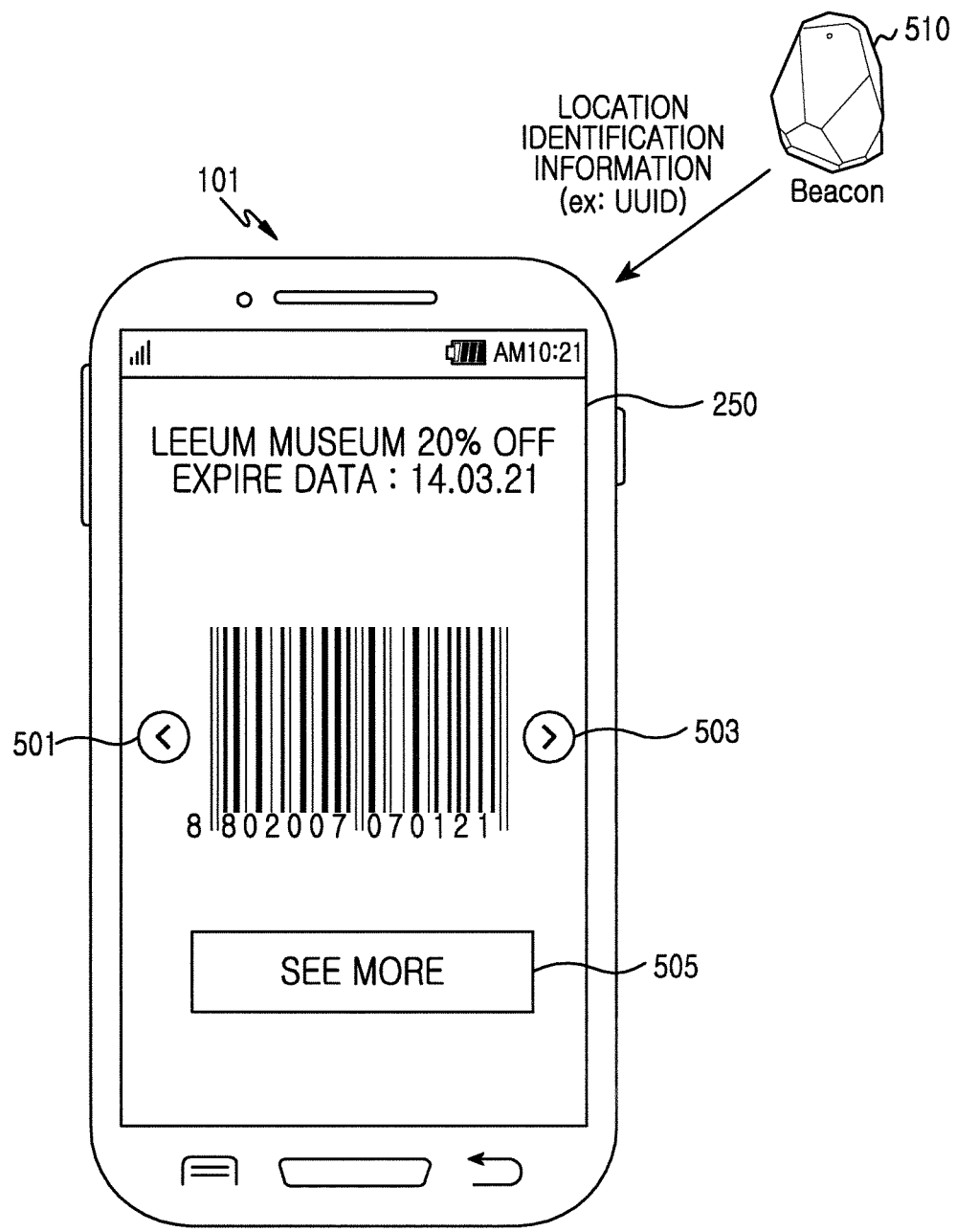
FIGS. 5A to 5D illustrate an method using an electronic device for receiving and/or outputting content according to this disclosure.

Hereinafter, various embodiments of the present disclosure will be described with reference to FIG. 5A. The electronic device 101 determines a content corresponding to received content identification information (for example, location identification information) from a database, and output the determined content. According to an embodiment of the present disclosure, the electronic device 101 receives location identification information from the beacon device 510 that is located in a designated place (for example, LEEUM MUSEUM™). The electronic device 101 determines 'LEEUM MUSEUM™ 20% OFF' content matching the received location identification information, from the database. The electronic device 101 displays the determined content in the display 250 of the electronic device 101. According to an embodiment of the present disclosure, which displays a content corresponding to a place (for example, LEEUM MUSEUM™) indicated by received location identification information, the 'LEEUM MUSEUM™ 20% OFF' content displayed in the display 250 of the electronic device 101 is one of the various contents of LEEUM MUSEUM™ stored in the database of the electronic device 101. The electronic device 101 uses the time information of the electronic device 101 to determine a content ('LEEUM MUSEUM™ 20% OFF') of LEEUM MUSEUM™ to be output in the display 250.

According to an embodiment of the present disclosure, when an expiration date is included in a content, the electronic device 101 assigns a high priority a content having a short expiration date based on the time information of the electronic device 101, and outputs coupons in the display 250 based on priorities. The electronic device 101 displays a menu (for example, an icon) 505 through which additional information of a corresponding content is determined, in the display 250 that displays the 'LEEUM MUSEUM™ 20% OFF' content. When the menu 505 through which additional information is determined, is selected, the electronic device 101 receives information associated with the 'LEEUM MUSEUM™ 20% OFF' content from a designated electronic device (for example, the server 106), and outputs the same through the display 250 (or the speaker 182). Herein, the related information includes at least one of a content of another event in a category identical or similar to the 'LEEUM MUSEUM™ 20% OFF' content, a content associated with a designated recommend event near 'LEEUM MUSEUM™' (for example, an area within a street designated based on 'LEEUM MUSEUM™'), a content associated with another event provided by 'LEEUM MUSEUM™', and a content provided by another point distinguished based on content identification information.

The electronic device 101 selects a menu (for example, a previous content menu 501 or a subsequent content menu 503) displayed in the display 250, and displays the corresponding content in the display 250. According to an embodiment of the present disclosure, when the previous content menu 501 displayed in the display 250 is selected, the electronic device 101 displays, in the display 250, a content before the 'LEEUM MUSEUM™ 20% OFF' content that is currently displayed in the display 250, from among various contents of 'LEEUM MUSEUM™'. For example, the content before the currently displayed content (for example, the 'LEEUM MUSEUM™ 20% OFF' content) is a content corresponding to 'LEEUM MUSEUM™' that the electronic device 101 receives before the corresponding content ('LEEUM MUSEUM™ 20% OFF') is received. In the same manner, when the subsequent content menu 503 displayed in the display 250 is selected, the electronic device 101 displays, in the display 250, a content subsequent to the 'LEEUM MUSEUM™ 20% OFF' content that is currently displayed in the display 250, from among various contents of 'LEEUM MUSEUM™'.

Figure 5B:
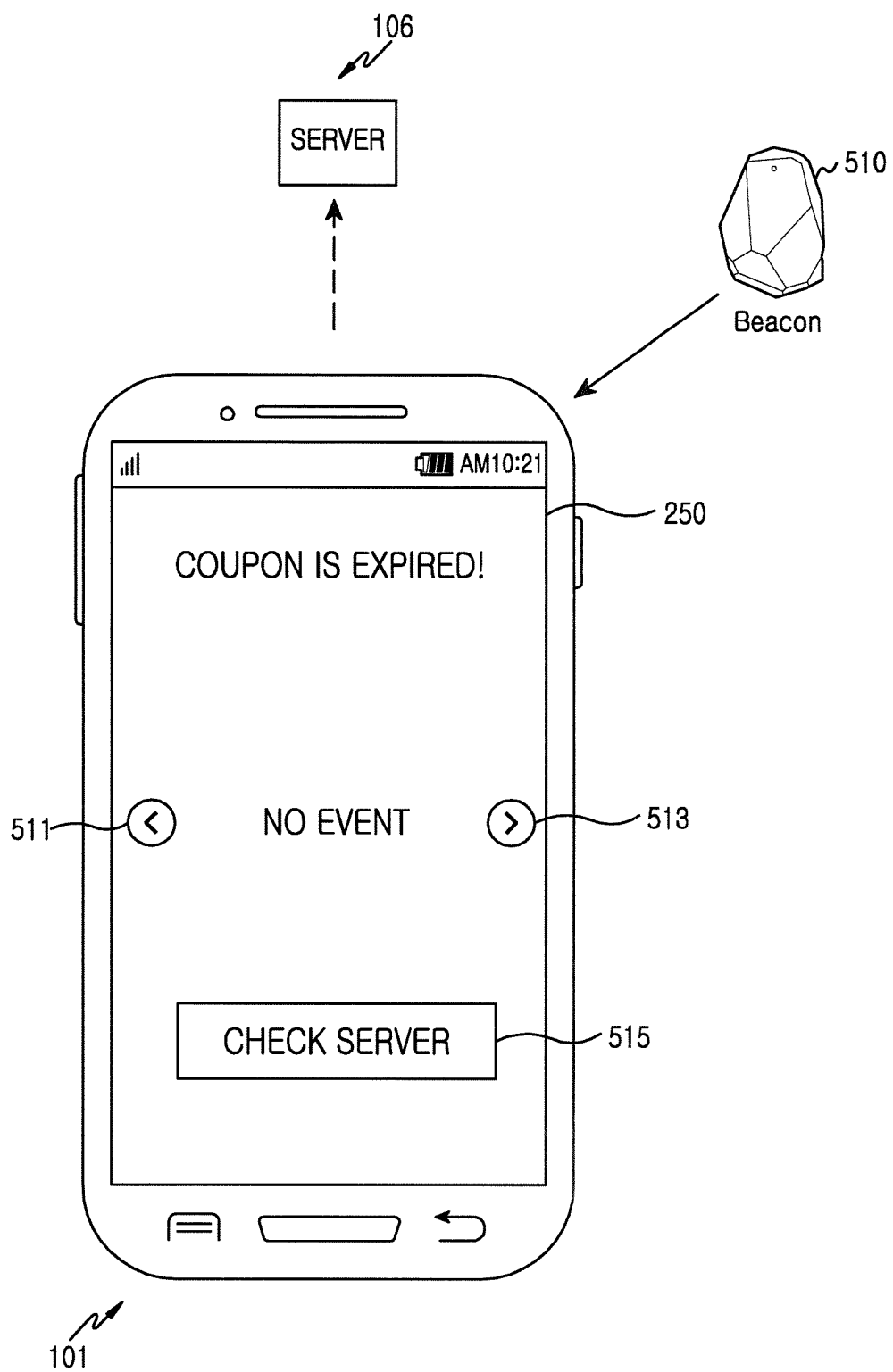

Hereinafter, various embodiments of the present disclosure will be described with reference to FIG. 5B. When the electronic device 101 is connected with a beacon device of a designated place through network communication, the electronic device 101 receives content identification information (for example, location identification information) from the beacon device and determines a content corresponding to the received location identification information with reference to the database of the electronic device 101. The expiration date of the content matching the location identification information that the electronic device 101 receives, is designated. When the electronic device 101 outputs the received content in the electronic device 101, the electronic device 101 compares the expiration date designated in the content with the time information of the electronic device 101, and outputs a corresponding designated message when it is determined that the content expires. According to an embodiment of the present disclosure, when the electronic device 101 is connected with a beacon device 510 located in Paris Baguette Jongno branch through designated network communication (for example, BLUETOOTH® communication), the electronic device 101 receives location identification information from the beacon device 520. The electronic device 101 determines a 'Paris Baguette Jongno branch' content matching the received location identification information, with reference to a database. When the electronic device 101 outputs the determined content, the electronic device 101 compares an expiration date included in the content and time information of the electronic device 101, and displays a message indicating that the content is unavailable as shown in FIG. 5B when the content expires.

The electronic device 101 displays, in a designated position of the display 250 that displays the message indicating the content is unavailable, a menu (for example, a previous content menu 511 or a subsequent content menu 513) to call another content corresponding to the location identification information received from the beacon device 520, and displays a menu 'check server' 515 that requests additional information from another electronic device (for example, the server 106) that receives a content corresponding to the location identification information. When 'check server' 515 is selected in a state in which the message indicating that the content is unavailable, is output, the electronic device 101 transmits the location identification information received from the beacon device 520, to the server 106 connected through the network communication. When the electronic device 101 transmits the location identification information to the server 106, the information includes at least one of version information of a content included in the database of the electronic device 101 based on the current location identification information, and information associated with a content provider (for example, PARIS BAGUETTE™).

Figure 5C:
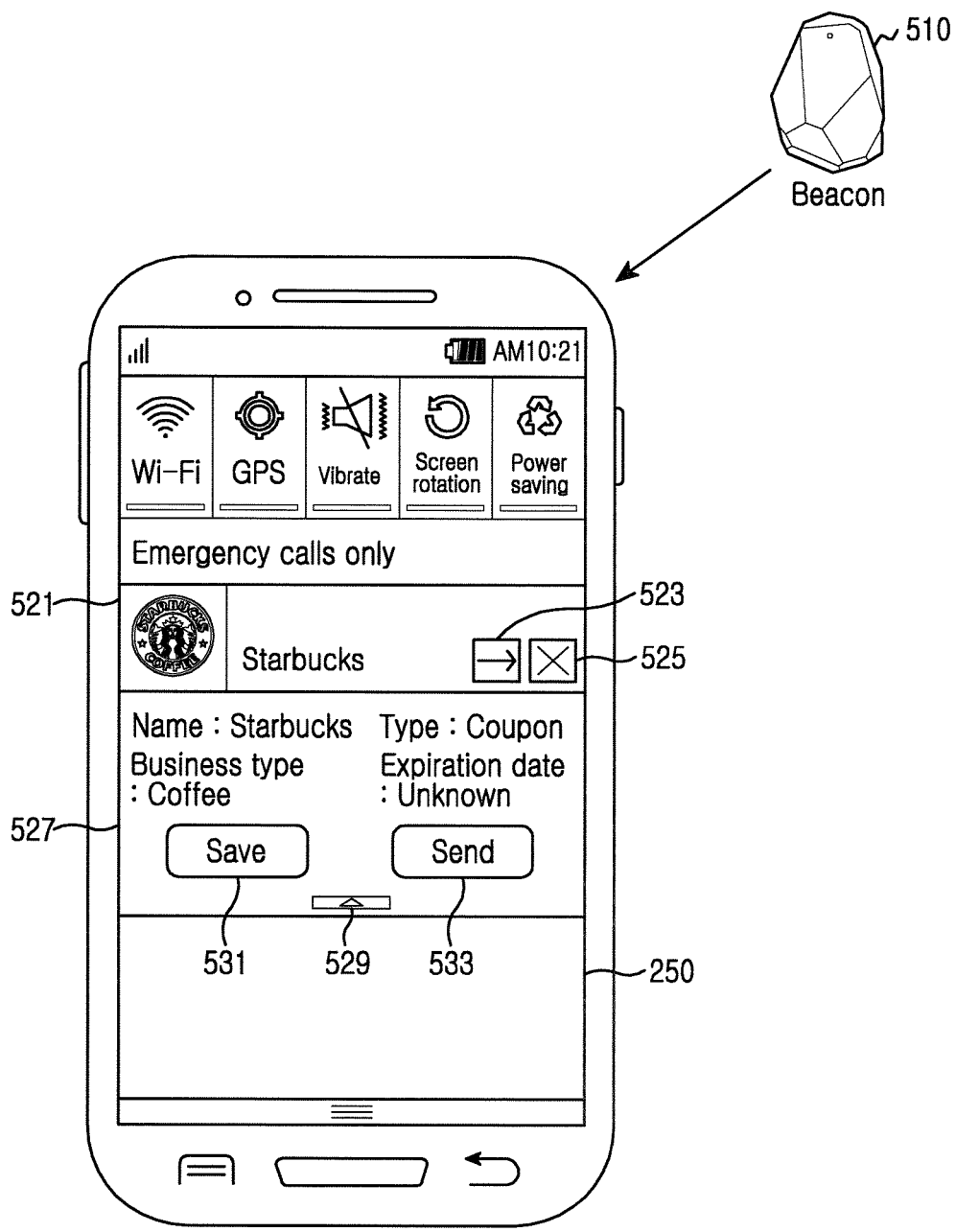

Hereinafter, various embodiments of the present disclosure will be described with reference to FIG. 5C. The electronic device 101 displays a content corresponding to the content identification information received from the beacon device 510 through a notification bar displayed in the display 250 of the electronic device 101. According to an embodiment of the present disclosure, the electronic device 101 determines content identification information received from the beacon device 510 as a content of STARBUCKS® (or a content of a designated branch of STARBUCKS®). The electronic device 101 displays, in an area of the notification bar, a first content 521 corresponding to the content identification information of the beacon device 510 based on setting information. When a designated area (for example, a logo image area of STARKBUCKS®) of the first content is selected, the electronic device 101 displays an area indicating detailed content 527 of the first content.

According to an embodiment of the present disclosure, the electronic device 101 display, in a designated area of the notification bar (an extended area of a part of the first content 521), information associated with the first content such as a business operator of a corresponding content (for example, STARBUCKS®), a type of a corresponding content (for example, a coupon), a type of business of a corresponding content (for example, coffee), an expiration date of a corresponding content (for example, unknown). When 'save' 531 is selected in the displayed detailed content 527, the electronic device 101 stores the displayed corresponding content 521 and/or detailed content 527 in the memory 230 (a designated location of a content list) of the electronic device 101. When 'send' 533 is selected, the electronic device 101 requests transmission of a second content corresponding to the first content 521 from the server 106. When 'hide' 529 is selected, the electronic device 101 cancels displaying (for example, hide) the detailed content 527 corresponding to the first content 521. When 'next' 523 is selected and a content that is different from the first content 521 displayed in the electronic device 101 exists in contents corresponding to the content identification information of the beacon device 510, the electronic device 101 displays a corresponding third content. When 'cancel of displaying' 525 is selected, the electronic device 101 cancels displaying a content corresponding to the content identification information of the beacon device 510 displayed in the notification bar of the display 250.

Figure 5D:

Hereinafter, various embodiments of the present disclosure will be described with reference to FIG. 5D. Based on a content displayed in the display 250, the electronic device 101 displays at least one content associated with the content. According to an embodiment of the present disclosure, the electronic device 101 provides a first content (for example, STARBUCKS® 521) corresponding to the content identification information, in the electronic device 101 based on the content identification information received from the beacon device 510 as illustrated in FIG. 5C, and when provided STARBUCKS® 521 is selected, the electronic device 101 displays a content provided from a branch of STARBUCKS®, corresponding to the content identification information of the beacon device 510 (for example, a discount content displayed in the display 250 of FIG. 5D). The electronic device 101 selects an 'order' menu 543 displayed in a designated position of the displayed content, and orders a product corresponding to the discount content. The electronic device 101 selects a designated object (for example, 'next' 541) and display another content in the corresponding location.

Figure 6A:
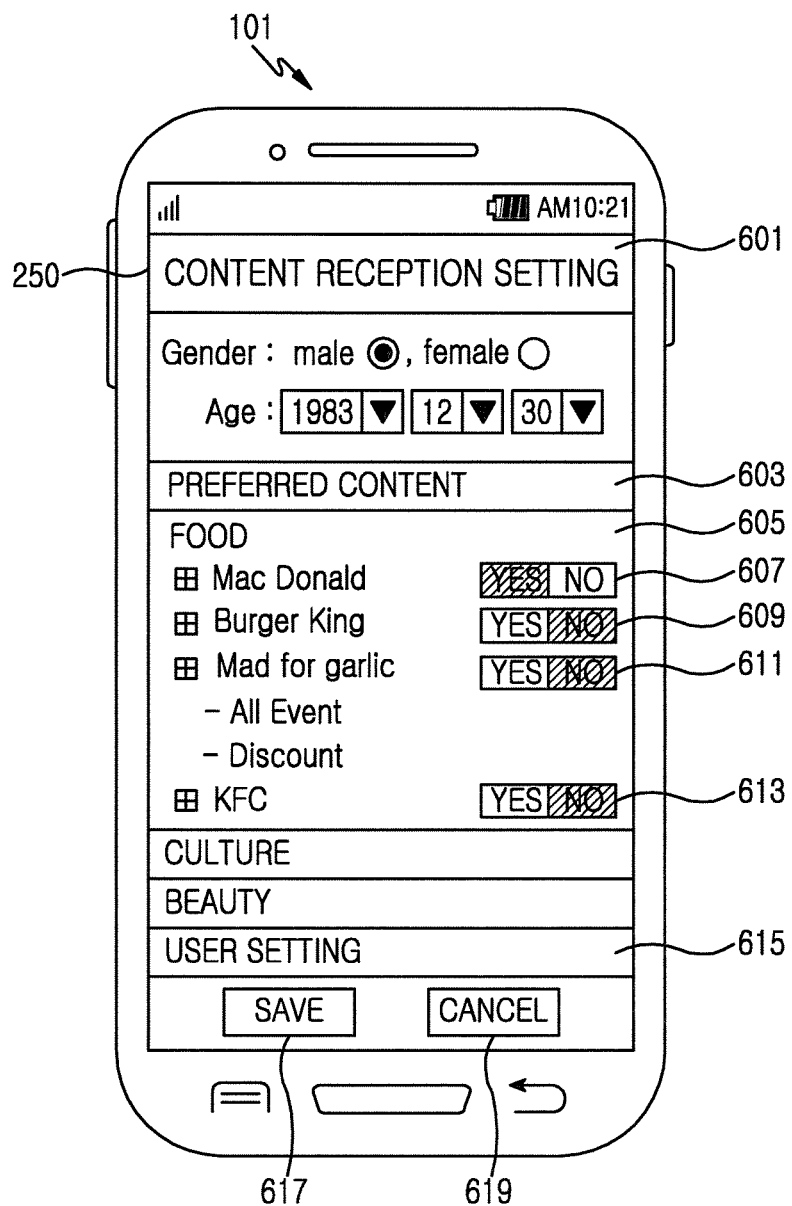
FIGS. 6A and 6B illustrate an example function of an electronic device for setting a content that is to be transmitted or received to/from a server according to this disclosure.
Figure 6B:
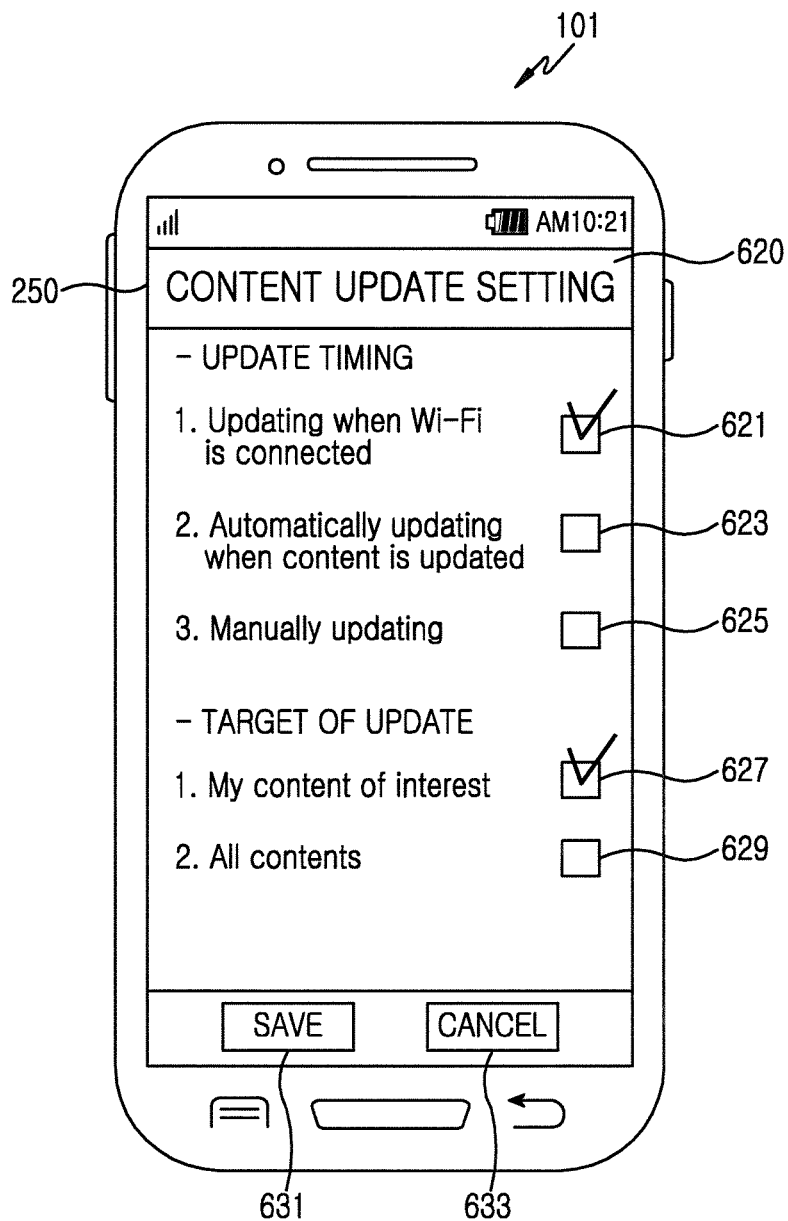

FIGS. 6A and 6B illustrate an example function of an electronic device for setting a content that is to be transmitted or received to/from a server according to this disclosure. Hereinafter, various embodiments of the present disclosure will be described with reference to FIG. 6A. The electronic device 101 determines a content to be received from another electronic device (for example, the server 106) connected with the electronic device 101 through network communication and/or a range of a category of the content. According to an embodiment of the present disclosure, the electronic device 101 inputs information such as gender, age or the like of a user through a setting function (for example, content reception setting 601). The electronic device 101 filters a content received from the server 106, based on the input user information. For example, the content received from the server 106 is classified based on gender and/or age, and the electronic device 101 determines a content matching the gender and/or age input as the user information. According to various embodiments of the present disclosure, the electronic device 101 transmits, to the server 106, the user information input through the setting function 601. The electronic device 101 receives a content filtered based on the user information from the server 106.

The electronic device 101 sets a preferable content 603 (or a content output from the electronic device 101) through the setting function 601, and manage the same using a wish list. According to an embodiment of the present disclosure, the electronic device 101 classifies contents into two or more categories, and display information associated with the classified categories in the setting function 601. The electronic device 101 filters a content included in the electronic device 101 based on category information selected from among content categories provided in the setting function 601. According to an embodiment of the present disclosure that classifies contents, the electronic device 101 classifies contents based on properties of a content, such as, a content provider, culture, beauty, or food. When contents are classified based on properties, classified contents (for example, culture, beauty, food, or the like) are further classified in detail, based on designated criteria (for example, Korean food, Japanese food, and Western food for food, musical, movie, and exhibition for art, and cosmetics, clothes, and accessories for beauty). Referring to the food category 605 of FIG. 6, the electronic device 101 provides a display to enable a user to select a content provider from the food category 605, and the electronic device selects 'no' 607 for a content associated with 'MACDONALDS®', 'yes' 609 for a content associated with BURGER KING®', 'yes' 611 for a content associated with 'MAD FOR GARLIC™', and 'yes' 613 for a content associated with 'KFC®' to set to output a corresponding content when content identification information associated with at least one of 'BURGER KING®,' 'MAD FOR GARLIC™,' and 'KFC®' is received. In addition, the electronic device 101 provides, through the setting function, a content associated with all events and a detailed setting menu such as discount, in a designated category, as shown in the case of 'MAD FOR GARLIC™.' When the electronic device 101 sets at least one category for filtering a content in the setting function, the electronic device 101 provides a menu 615 for a user to set a category, in addition to a designated category. When 'save' 617 or 'save' 631 illustrated in FIG. 6B is selected, the electronic device 101 stores the configuration determined in the setting function, and when 'cancel' 619 or 'cancel' 633 illustrated in FIG. 6B is selected, the electronic device 101 may not store correction made in the setting function and terminates the setting function. The preferred content category information included in the configuration stored through 'save' is stored (or updated) in a wish list.

Hereinafter, various embodiments of the present disclosure will be described with reference to FIG. 6B. The electronic device 101 updates a content stored in the electronic device 101, based on setting information associated with content updating. According to an embodiment of the present disclosure, the electronic device 101 provides content update setting 620, and determines a point in time of updating a content stored in the memory 230 of the electronic device 101 through setting 620. For example, the electronic device 101 determines, as the point in time of updating a content, at least one of 'updating when WiFi is connected' 621, 'automatically updating when a content is updated in the server 106' 623, and 'manually updating' 625. Referring to FIG. 6B, the electronic device 101 executes content updating from the server 106 when WiFi is connected.

The electronic device 101 determines a content to be updated through the setting 620. According to an embodiment of the present disclosure, when 'my content of interest' 627 is selected, the electronic device 101 updates a content designated in the 'my content of interest' category, or when 'all contents' 629 is selected, the electronic device 101 updates all the contents stored in the electronic device 101. Referring to FIG. 6B, the electronic device 101 executes a control to update a content included in the 'my content of interest' category of the electronic device 101 when WiFi is connected. When updating a content, the electronic device 101 determines whether an updated version of a designated content exists in the server 106, and receives an updated content so as to update a content stored in the memory 230 of the electronic device 101.

Figure 7A:
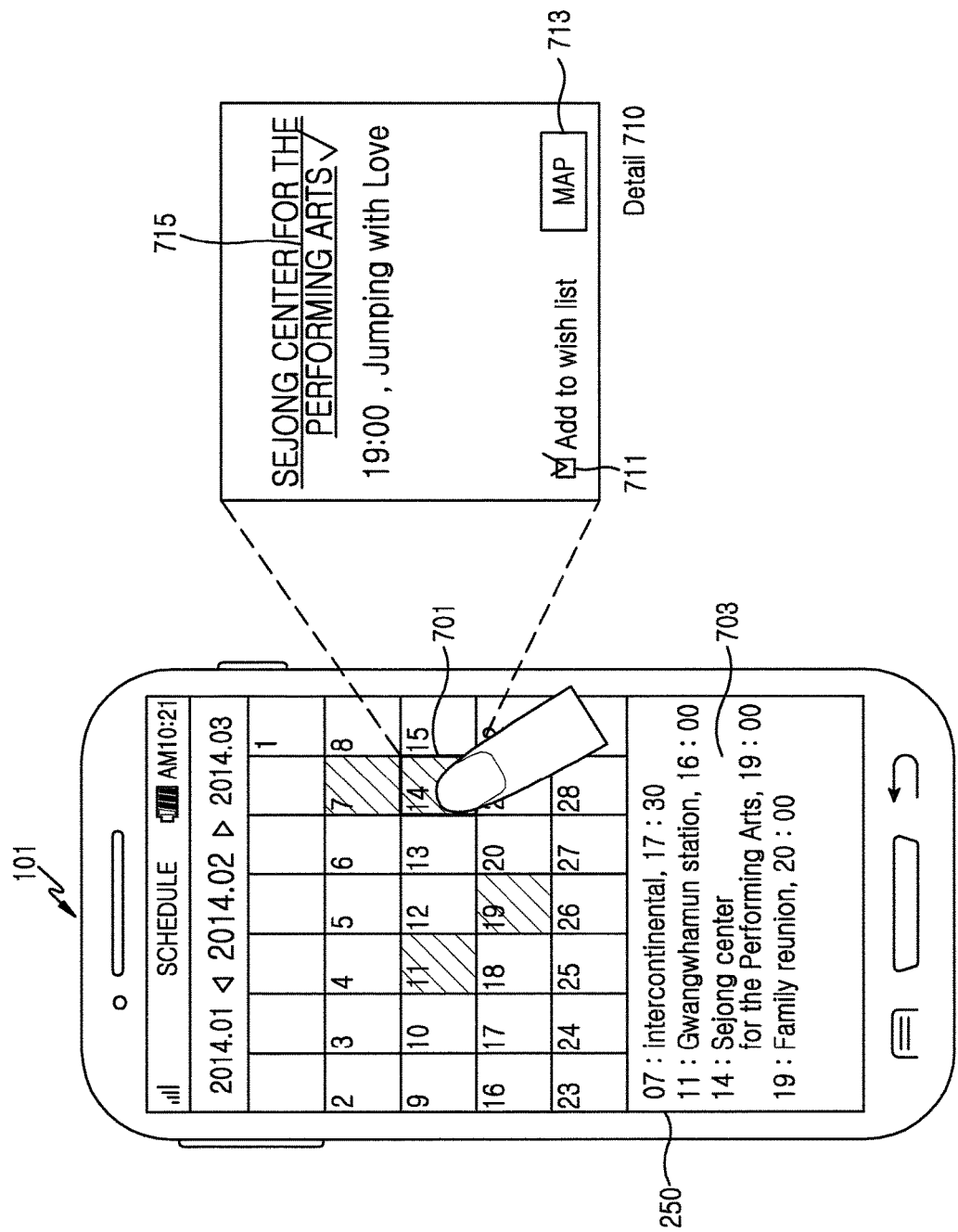
FIGS. 7A and 7B illustrates an example method using an electronic device for setting a wish list in conjunction with a designated program according to this disclosure.
Figure 7B:
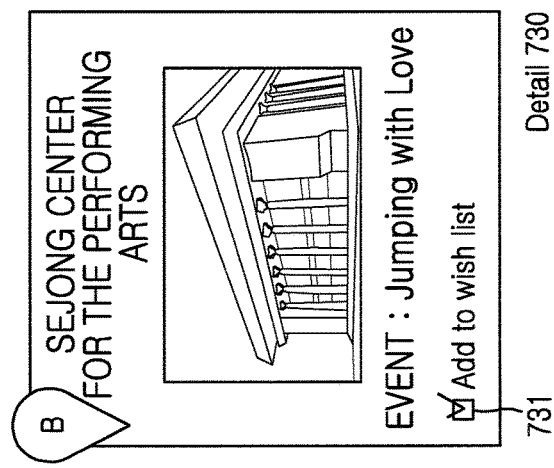
Figure 7B:
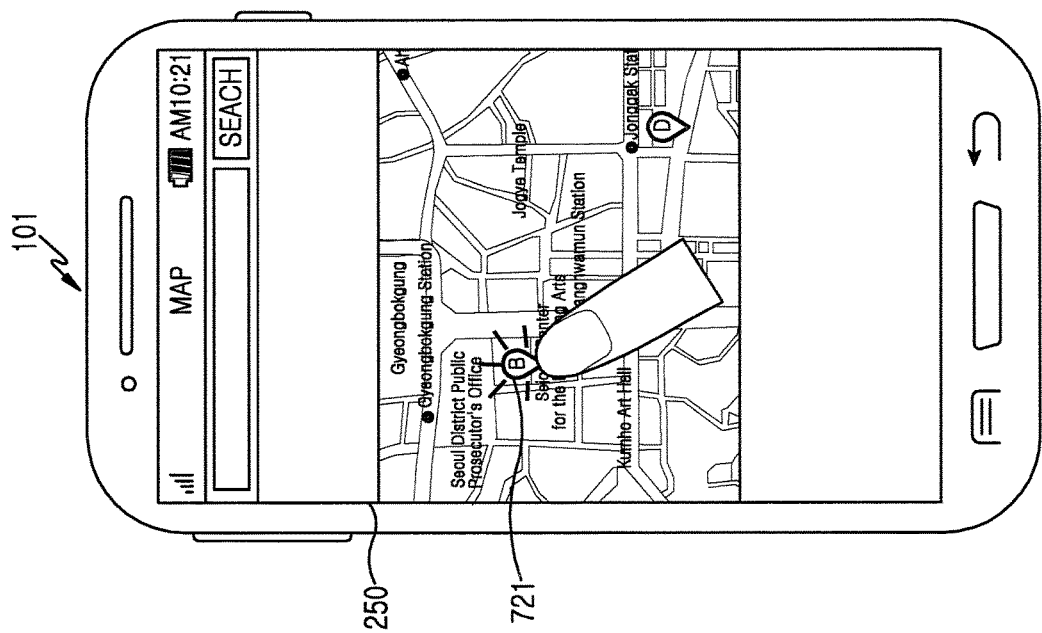

FIGS. 7A and 7B illustrates an example method using an electronic device for setting a wish list in conjunction with a designated program according to this disclosure. When determining a category of a content included in a wish list, the electronic device 101 may not limit a category to a setting function provided in the electronic device 101 (for example, the content reception setting of FIG. 6), and sets a category using a designated program included in the electronic device 101.

Hereinafter, various embodiments of the present disclosure will be described with reference to FIG. 7A. The electronic device 101 inputs information associated with a predetermined place, an event provided in a predetermined place, and a predetermined time, through a schedule program (please refer to the display 250 of FIG. 7A). The electronic device 101 displays a date including input information in the display 250 of the electronic device 101, through the schedule program. According to an embodiment of the present disclosure, when it is determined that a schedule (a schedule 701 on the 14th day) designated in the schedule program displayed through the display 250 is selected, the electronic device 101 displays schedule information 710 associated with the schedule (for example, SEJONG CENTER FOR THE PERFORMING ARTS™, 19:00, Jumping with love) designated in the selected date.

According to an embodiment of the present disclosure, the electronic device 101 displays the schedule information 710 in the display 250 through a layer that displays the schedule program or a separate layer. The electronic device 101 displays a menu (for example, 'add to wish list' 711) for determining whether to include an object in a wish list, together with the schedule (SEJONG CENTER FOR THE PERFORMING ARTS™, 19:00, jumping with love) included in the schedule information 710. The electronic device 101 select at least one object 715 (for example, SEJONG CENTER FOR THE PERFORMING ARTS®) to be included in the wish list, from the displayed schedule information 710 through a designated input motion such as a touch motion, and when the menu 711 for determining whether to include an object to the wish list is selected (for example, checked), the electronic device 101 additionally includes, in the wish list, a category of the object (for example, SEJONG CENTER FOR THE PERFORMING ARTS™) selected from the schedule 701 of the 14th day.

The electronic device 101 displays a date where a schedule is set through the schedule program and contents 703 in the display 250 of the electronic device 101, and call the schedule information associated with at least one schedule so as to include a category corresponding to the designated object in the wish list. To include category information of a designated content in the wish list including the category information associated with a content to be received from the server 106, the electronic device 101 displays, in a designated position of a first program (for example, a schedule program), a menu (or icon) 713 for calling a second program (for example, a map program) that is functionally connected with the first program.

Hereinafter, various embodiments of the present disclosure will be described with reference to FIG. 7B. The electronic device 101 selects a category of a content that the electronic device 101 desires to include in a wish list through a map program (please refer to the display 250 of FIG. 7B). According to an embodiment of the present disclosure, the electronic device 101 displays, in the map program, a location corresponding to a content that is provided by at least one content provider through the map program. For example, the electronic device 101 displays location information of a content corresponding to a content provider such as SEJONG CENTER FOR THE PERFORMING ARTS™ (B of FIG. 7B) or Seoul history museum (D of FIG. 7B), in a map of the Gwangwhamun region through the map program.

When an operation of selecting SEJONG CENTER FOR THE PERFORMING ARTS™ (such as B of FIG. 7B) (for example, a motion of touching B 721) is detected, the electronic device 101 displays information 730 associated with SEJONG CENTER FOR THE PERFORMING ARTS™ (B of FIG. 7B) in the designated position of the display 250. The electronic device 101 displays the information 730 associated with SEJONG CENTER FOR THE PERFORMING ARTS™ (B of FIG. 7B) in the display 250 of the electronic device 101, through a layer that displays the map program or a separate layer. According to an embodiment of the present disclosure, the electronic device 101 displays information associated with an event (for example, Jumping with love) provided in SEJONG CENTER FOR THE PERFORMING ARTS™, and displays a menu (for example, 'add to wish list' 731) for determining whether to include an object in the wish list. When a motion of selecting (or checking) the menu (for example, 'add to wish list' 731) for determining whether to include an object in the wish list, is detected, the electronic device 101 includes a category associated with SEJONG CENTER FOR THE PERFORMING ARTS™ in the wish list.

Figure 8:
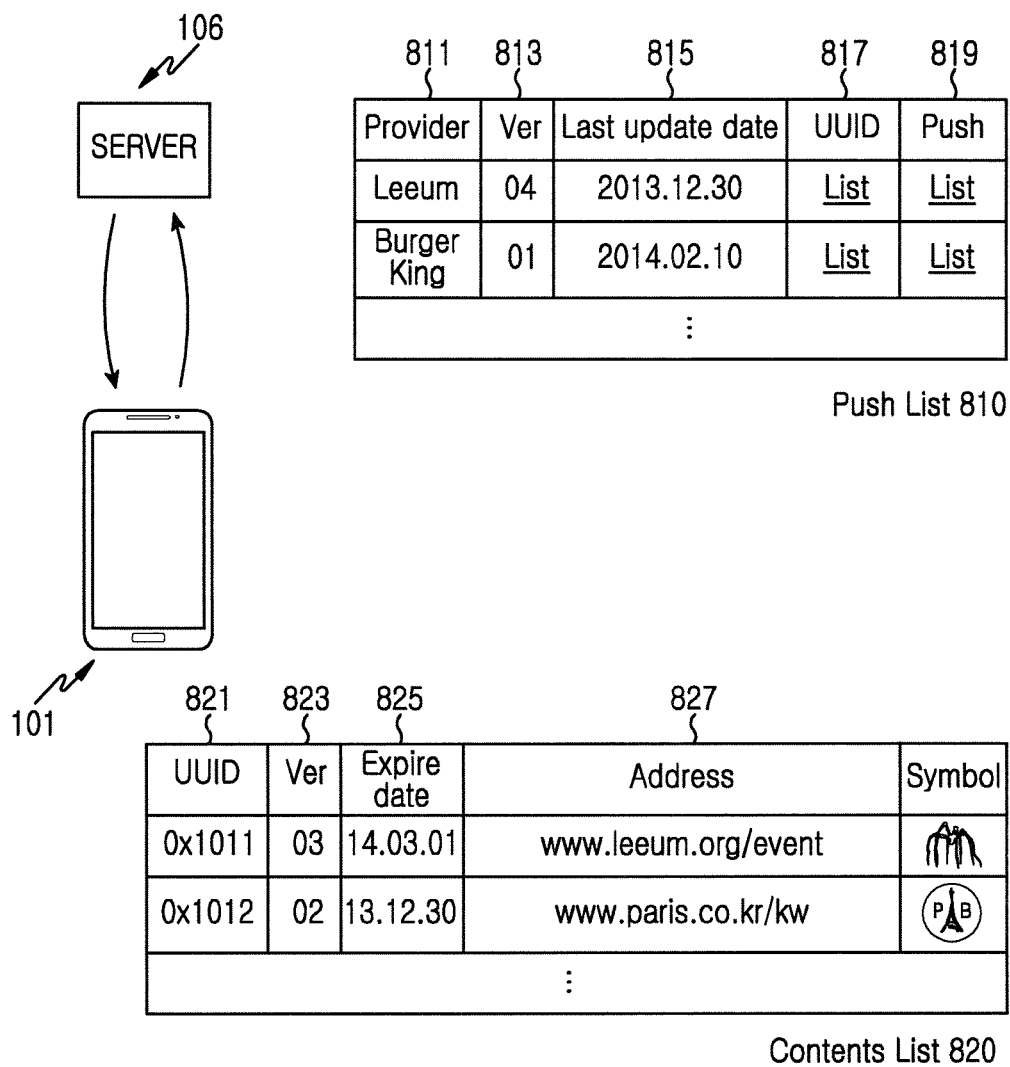
FIG. 8 illustrates an example electronic device and an example database of a server that provides a content according to this disclosure.

FIG. 8 illustrates an example electronic device and an example database of a server that provides a content according to this disclosure. The electronic device 101 receives, from the server 106, a notification message for a content updated by a content provider. The electronic device 101 compares the content corresponding to the received notification message with a content stored in a database, and receives a content of an updated version through the server 106 when the versions are different between the contents. According to an embodiment of the present disclosure, the electronic device 101 receives a notification message for an updated content (for example, a new content of a content provider, 'LEEUM MUSEUM™'), from the server 106. The electronic device 101 determines that the version of the content updated in the server 106 is '04' from the received notification message, and the electronic device 101 compares the version with a version (for example, '03') of at least one (for example, a content having UUID 821 of 0x1011) of the contents corresponding to 'LEEUM MUSEUM™' stored in the database, so as to determine that the version of the content stored in the database of the electronic device 101 is an old version. Here, UUID 821 is content identification information corresponding to a designated agency of a designated content provider. The electronic device 101 requests transmission of a new content associated with 'LEEUM MUSEUM™' from the server 106 when the content version 823 of a corresponding UUID is an old version.

According to setting information or when a designated manipulation is detected, the electronic device 101 compares an expiration date 825 of a content included in the database of the electronic device 101 with time information of the electronic device 101, and determines a content that expires. According to an embodiment of the present disclosure, the electronic device 101 compares the expiration date 825 (for example, Dec. 30, 2013) of a content corresponding to UUID 821 of 0x1012 included in the database of the electronic device 101 with the time information (for example, Feb. 14, 2014) of the electronic device 101, and determines that the content expires. The electronic device 101 requests the server 106 to check whether an updated content exists in association with a subordinate content provider (for example, PARIS BAGUETTE™) corresponding to UUID 821 of 0x1012. The electronic device 101 receives a notification message associated with updating of a new content from the server 106, and requests transmission of the updated content. In addition, the electronic device 101 directly requests transmission of the new content from an address 827 of the content provider or connects to the address of the content provider, by requesting the transmission of the content.

The server 106 includes, in the database, a list (push list 810) of contents classified based on a content provider. The push list 810 includes at least one of a version 813 of a content updated by a content provider 811, a last content update date 815, a UUID list 817 of a content provider, and a push list 819 of other electronic devices to which a content notification list is to be transmitted. When a content provider (for example, 'LEEUM MUSEUM™') updates a content, the server 106 transmits a notification message associated with content updating to various electronic devices included in the push list 819 of 'LEEUM MUSEUM™.' When a designated electronic device requests transmission of a new content, the server 106 transmits an updated content of a corresponding content provider to the designated electronic device.

According to various embodiments of FIG. 8, in the relationship between the electronic device 101 and the server 106, the operations executed by the server 106 are executed by the electronic device 101. When a content is updated by a content provider, a notification message of the updated content is transmitted to another designated electronic device (for example, the electronic device 102), and when the transmission of a content is requested by electronic device 102, a designated content is transmitted. When a content is updated by a content provider, the electronic device 101 may not limit an operation to transmitting a notification message, and transmits an updated content to another electronic device designated to provide a content based on the database.

Figure 9A:
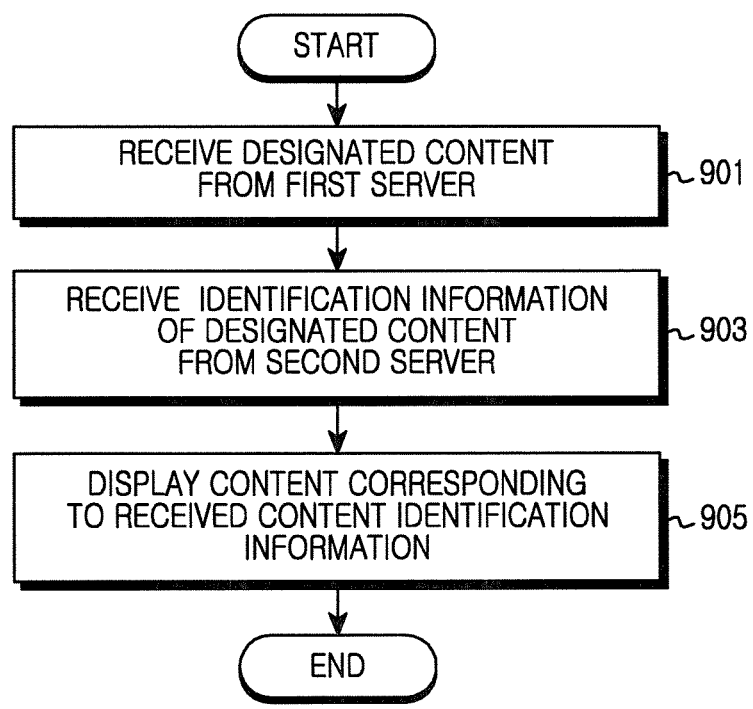
FIGS. 9A and 9B are flowcharts illustrating an example method of processing content using an electronic device according to this disclosure.
Figure 9B:
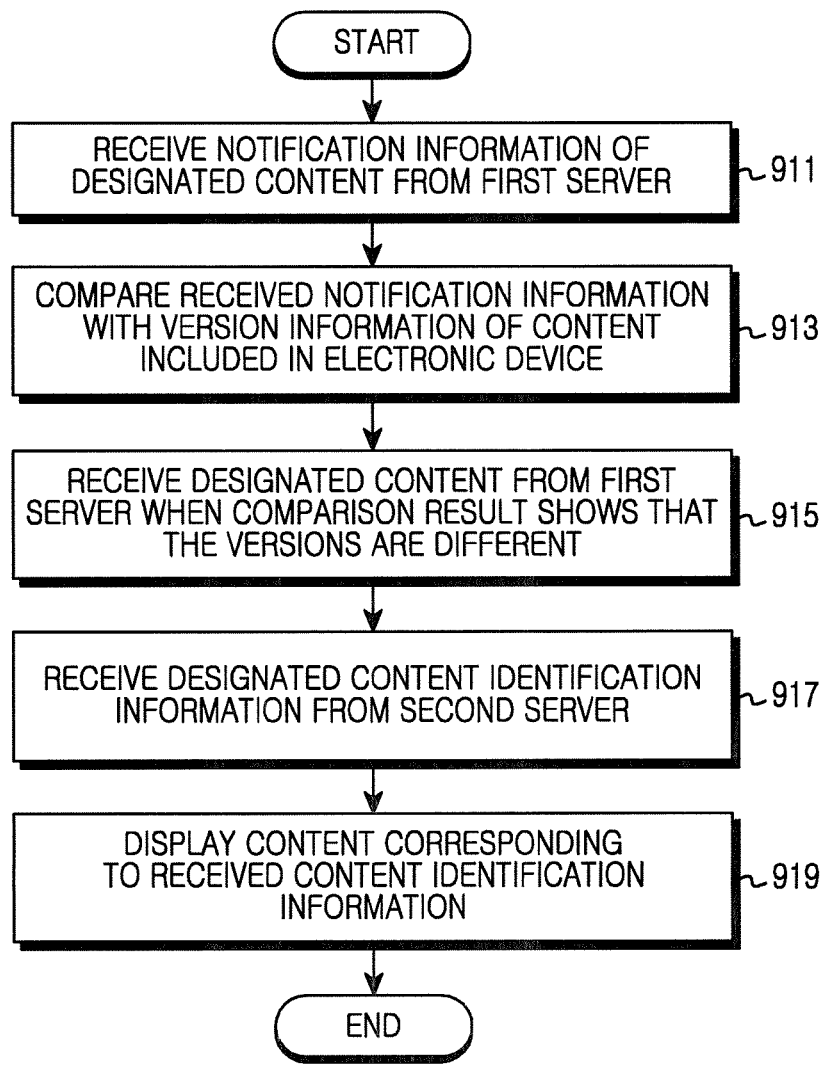

FIGS. 9A and 9B are flowcharts illustrating an example method of processing a content in an electronic device according to this disclosure. Hereinafter, various embodiments of the present disclosure will be described with reference to FIG. 9A. In operation 901, the electronic device 101 receives a designated content from a first server. Here, the first server is the server 106. Here, the designated content is a content updated by a content provider. When the server 106 receives (updates) a new content from a content provider, the electronic device 101 receives the content based on a database of the server 106.

In operation 903, the electronic device 101 receives designated content identification information from a second server. Here, the second server is a beacon device, and is a beacon device located in an agency (for example, Gwangwhamun branch) of a designated content provider (for example, KFC®) according to an embodiment of the present disclosure. The beacon device transmits content identification information (for example, UUID) corresponding to an agency, over a communication area, and when the electronic device 101 is located in the communication area of the beacon device, the electronic device 101 receives the content identification information (for example, UUID) from the beacon device.

In operation 905, the electronic device 101 determines a content matching the received content identification information from a database of the electronic device 101. The electronic device 101 displays the determined content in the display 250 of the electronic device, requests additional information of the determined content from the server 106 through a designated manipulation, or accesses an address provided by a content provider.

The electronic device 101 terminates the embodiment of FIG. 9A, after executing operation 905. Hereinafter, various embodiments of the present disclosure will be described with reference to FIG. 9B. In operation 911, the electronic device 101 receives a designated content from a first server. Here, the first server is the server 106. Here, the designated content is a content updated by a content provider. When the server 106 receives (updates) a new content from a content provider, the electronic device 101 receives the content or a notification message of the updated content based on the database of the server 106.

In operation 913, the electronic device 101 compares a version of the received content or a content version included in the received content notification information, with a version of a corresponding content included in the database of the electronic device 101. According to an embodiment of the present disclosure, when an updated content of 'KFC®' or a notification message associated with the content is received from the server 106, the electronic device 101 compares a version of a content of 'KFC®' included in the database of the electronic device 101 with a version of the received content or a version included in the content notification message.

In operation 915, when it is determined that the version of the content of 'KFC®' included in the database is different from the version of the received content or the version included in the content notification message, the electronic device 101 requests the first server (for example, the server 106) to transmit the updated content of a content provider. The electronic device 101 receives, from the server 106, the updated content of the designated content provider.

In operation 917, the electronic device 101 receives designated content identification information from a second server. Here, the second server is a beacon device, and is a beacon device located in an agency (for example, Gwangwhamun branch) of a designated content provider (for example, KFC®) according to an embodiment of the present disclosure. The beacon device transmits content identification information (for example, UUID) corresponding to an agency, over a communication area, and when the electronic device 101 is located in the communication area of the beacon device, the electronic device receives the content identification information (for example, UUID) from the beacon device.

In operation 919, the electronic device 101 determines a content matching the received content identification information from the database of the electronic device 101. The electronic device 101 displays the determined content in the display 250 of the electronic device, requests additional information of the determined content from the server 106 through a designated manipulation, or accesses an address provided by a content provider. The electronic device 101 terminates the embodiment of FIG. 9A, after executing operation 919.

Figure 10:
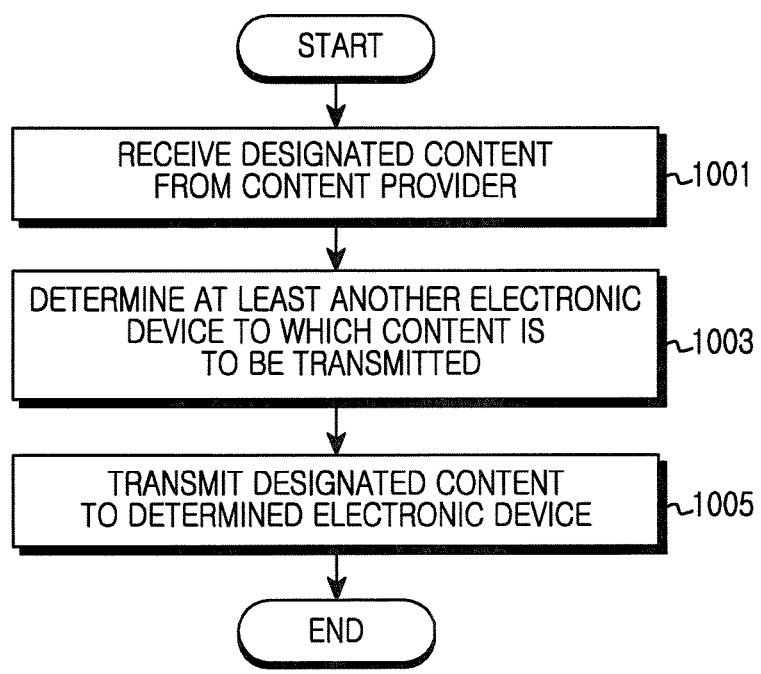
FIG. 10 is a flowchart illustrating an example method using an electronic device for executing a function of a server according to this disclosure.

FIG. 10 is a flowchart illustrating an example method using an electronic device for executing a function of a server according to this disclosure. In operation 1001, the electronic device 101 receives a designated content from a content provider. According to an embodiment of the present disclosure, the electronic device 101 receives a content from the content provider based on an updating scheme, and compares a version of a previously received content with a version of a content to be updated.

In operation 1003, the electronic device 101 determines at least another electronic device (for example, electronic device 102) to which the content received from the content provider or a notification message associated with the content is to be transmitted. According to an embodiment of the present disclosure, the electronic device 101 classifies the previously received contents for each content provider in the database, and includes a push list for each content provider. When a content is updated from the content provider, the electronic device 101 determines at least another electronic device (for example, the electronic device 102) included in the push list.

In operation 1005, the electronic device 101 transmits the updated content or the notification message associated with the content to the determined at least another electronic device (for example, the electronic device 102). When the electronic device 101 receives, from the electronic device 102, a request for transmission of a content or a request for transmission of additional information associated with a content, the electronic device 101 transmits a corresponding content. The electronic device 101 terminates the embodiment of FIG. 10, after executing operation 1005.

Figure 11A:
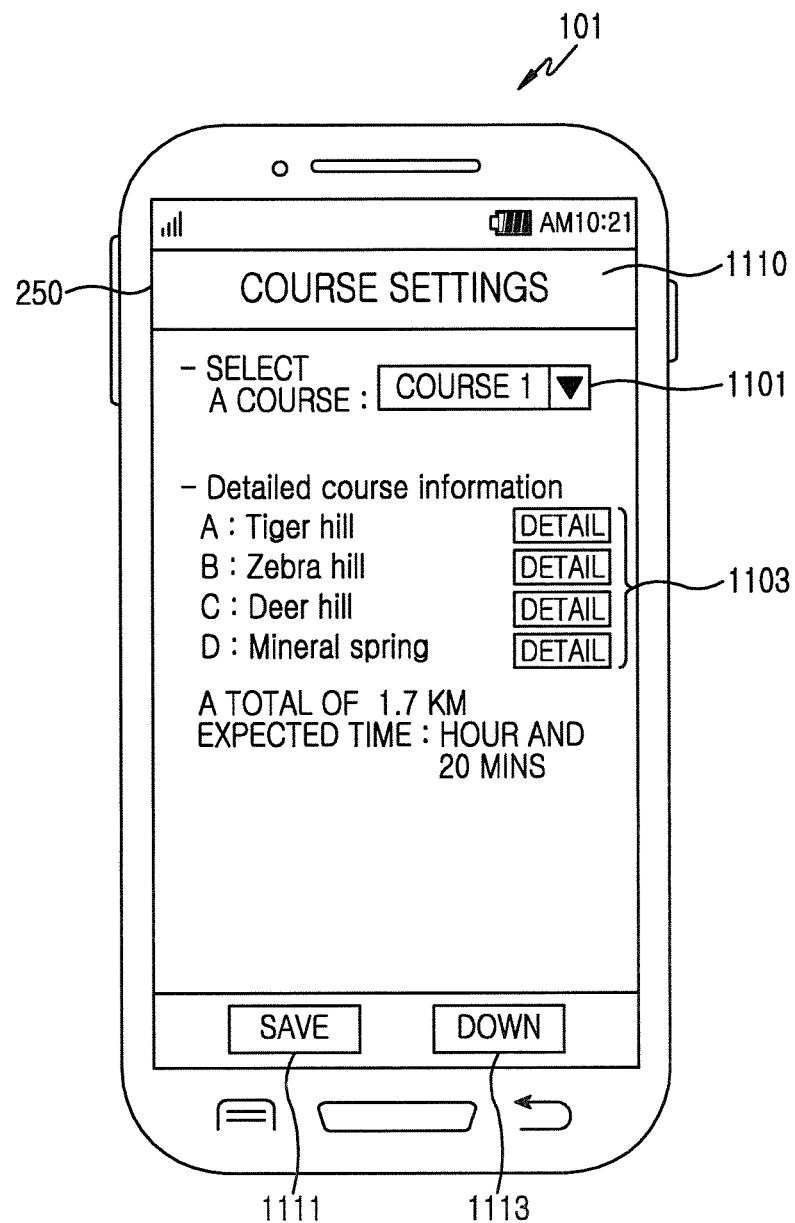
FIG. 11A and FIG. 11B illustrate examples of an electronic device utilizing received content according to this disclosure.
Figure 11B:
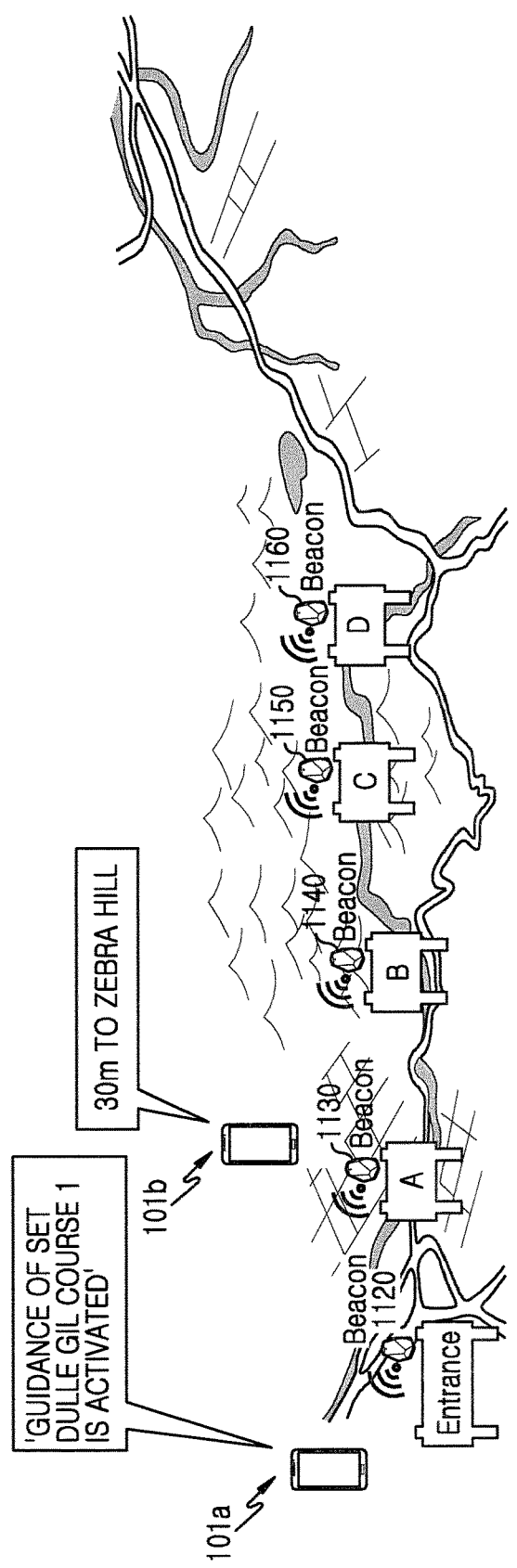

FIG. 11A and FIG. 11B illustrate examples in which an electronic device utilizes a received content according to this disclosure. The electronic device 101 receives a content selected by a user, and, when the electronic device 101 is located in a designated area (for example, a communication area of a beacon device) (for example, when content identification information of a beacon device is received in a designated location), the electronic device 101 executes a designated function based on the received content and/or the content identification information transmitted by a beacon device. According to an embodiment of the present disclosure, the electronic device 101 receives a content corresponding to a course selected by a user, and executes a guidance function (navigation function) based on the received content and/or a beacon device.

Hereinafter, various embodiments of the present disclosure will be described with reference to FIG. 11A. The electronic device 101 applies a content received from the server 106 to various functions provided in the electronic device 101. According to an embodiment of the present disclosure, the electronic device 101 applies a content received by selection in 'course settings' 1110 of a user to a navigation program provided in the electronic device 101. For example, when a user desires to receive guidance associated with Jeju Dulle Gil (for example, a designated path of Jeju Dulle Gil), the electronic device 101 determines at least one path from among various paths of Juju Dulle Gil provided by a content provider, through the server 106. When at least one path (for example, course 1 1101) is selected from among provided paths, the electronic device 101 receives content identification information of beacon devices included in the selected path. When course 1 1101 is selected, the electronic device 101 receives, from the server 106, content identification information of beacon devices located in points included in the course 1 1101, such as Tiger Hill, Zebra Hill, Deer Hill, and a mineral spring. In addition, the electronic device 101 displays a menu 1103 that provides detailed information of the selected paths. The electronic device 101 requests information corresponding to a point selected in the menu 1103 from the server 106, and provides received information in the electronic device 101. In addition, the electronic device 101 receives, from the server 106, information associated with a total distance of a selected path or an estimated time, and provide the same. The electronic device 101 stores ('save' 1111) information associated with the selected path (for example, information that the electronic device 101 currently displays based on a selection of a user), and receives ('down' 1113) information associated with a beacon device located in a point included in the selected path.

Hereinafter, various embodiments of the present disclosure will be described with reference to FIG. 11B. The electronic devices 101*a* and 101*b* provide a content corresponding to a location of the electronic device 101*a* or 101*b* based on a content received from the server 106. According to an embodiment of the present disclosure, the content that the electronic device 101*a* or 101*b* receives from the server 106 is a content that is received as a user makes a selection and sends a request to the server 106, and, when the electronic device 101*a* or 101*b* is located in a location designated in the content (for example, a beacon device in a location designated in a content), the electronic device 101*a* or 101*b* receives content identification information from the beacon device. The electronic device 101 determines a content corresponding to the received content identification information from among contents received from the server 106, and provides the same in the electronic device 101*a* or 101*b*.

According to an embodiment of the present disclosure, the electronic device 101 receives a content associated with a designated path, based on a selection of a user in a navigation program. For example, a content associated with a designated path received based on a selection of a user is a content associated with 'Jeju Dulle Gil course 1 (for example, please refer to FIG. 11A). The electronic device 101*a* or 101*b* receives content identification information from a beacon device 1120 located in the entrance of 'Jeju Dulle Gil course 1', and activates a 'Jeju Dulle Gil course 1' content of the navigation program based on the content identification information. In addition, the electronic device 101*a* or 101*b* activates the 'Jeju Dulle Gil course 1' content of the navigation program through a selection of a user, in addition to using the content identification information received from the beacon device 1120. When the 'Jeju Dulle Gil course 1' content of the navigation program is activated, the electronic device 101*a* or 101*b* displays or output content activation information such as 'guidance of the set Jeju Dulle Gil course 1 is activated' through the display 250 or the speaker 182.

In addition, information associated with a next destination 'Tiger Hill' of the activated course 1 is provided. When the electronic device 101*a* or 101*b* provides information associated with 'Tiger Hill', the electronic device 101*a* or 101*b* provides information associated with a distance to the 'Tiger Hill' and/or an expected time. When the electronic device 101*a* or 101*b* is located in a data transmission/reception area of a beacon device 1130 located in a point A, the electronic device 101*a* or 101*b* receives content identification information from the beacon device 1130. When the content identification information received from the beacon device 1130 based on the content associated with 'Jeju Dulle Gil course 1', is content identification information corresponding to 'Tiger Hill' designated as a next destination, the electronic device 101*a* or 101*b* provides information associated with a next destination 'Zebra Hill.' According to an embodiment of the present disclosure, the electronic device 101*a* or 101*b* provides information associated with a distance of 30 m to 'Zebra Hill', an expected time to 'Zebra Hill', and a distance to a final destination and/or an expected time, and information associated with 'Zebra Hill' such as the origin of the name. The electronic device 101*a* or 101*b* executes operations described in the above described embodiment when the electronic device 101*a* or 101*b* receives content identification information, by being located in a data transmission/reception area of a beacon device 1160 located in a point D (for example, a mineral spring) which is the final destination after passing a data transmission/reception area of a beacon device 1140 located in a point B (for example, Zebra Hill) and a data transmission/reception area of a beacon device 1150 located in a point C (for example, Deer Hill).

In addition, when the content identification information received from the beacon device is different from content identification information associated with a next designated destination, the electronic device 101*a* or 101*b* provides information associated with the next designated destination. According to an embodiment of the present disclosure, when content identification information received from a beacon device after content identification information is received from the beacon device 1130 located in the point A, is different from the content identification information of the beacon device 1120 located in the point B, or when content identification information is not received during a predetermined period of time after the expected time to the point B, the electronic device 101 determines a location of the electronic device 101*a* or 101*b* through a device that determines a position such as a GPS included in the electronic device 101*a* or 101*b*, and provide a guidance to the point B based on the location. Alternatively, when another path that uses based on the location of the electronic device 101*a* or 101*b*, exists, information associated with the path is provided. Information provided in the electronic device 101*a* or 101*b* is displayed in the display 250 of the electronic device 101*a* or 101*b*, or is output as a designated audio through the speaker 182.

Figure 12:
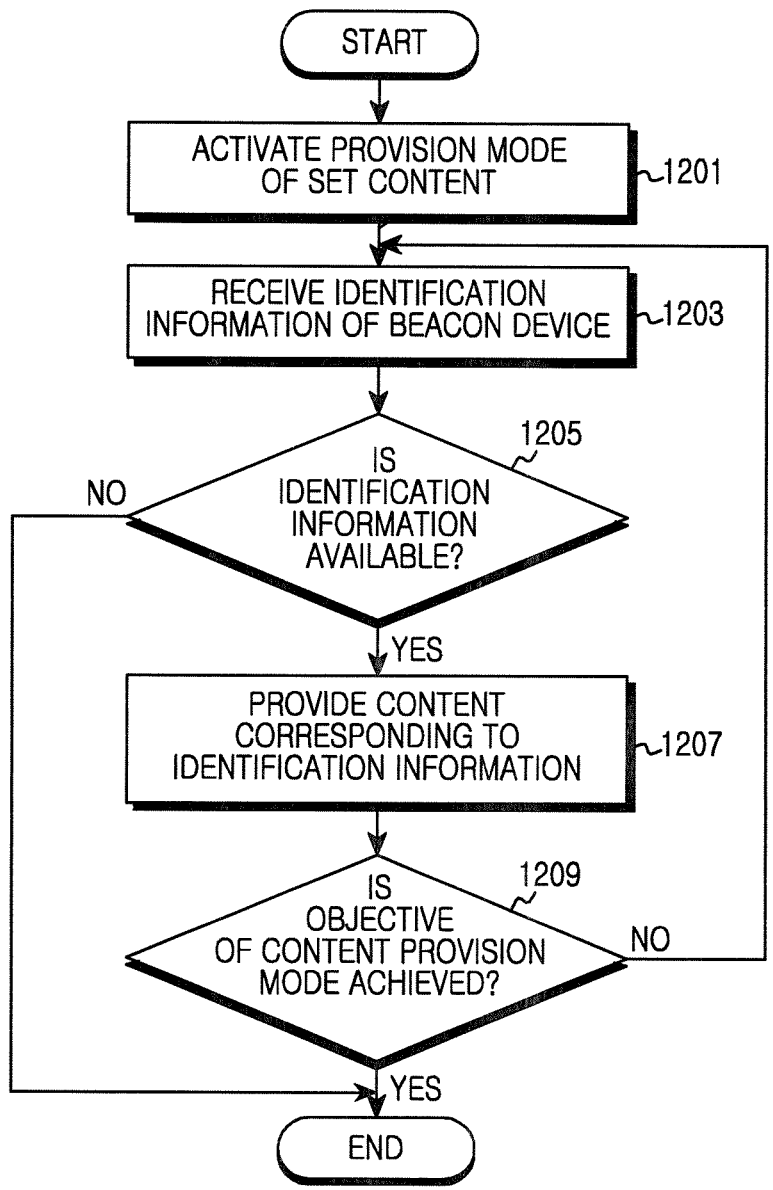
FIG. 12 is a flowchart illustrating an example method of providing content based on a content set in an electronic device and received content identification information according to this disclosure.

FIG. 12 is a flowchart illustrating an example method of providing a content based on a content set in an electronic device and received content identification information according to this disclosure. In operation 1201, the electronic device 101 activates a provision mode of a set content. According to an embodiment of the present disclosure, the electronic device 101 receives, from the server, a content that is requested based on a selection of a user, and sets the received content through a designated program (for example, a navigation program) of the electronic device 101. The electronic device 101 activates the set content based on a user input. Alternatively, the electronic device 101 activates a content corresponding to content identification information received from a designated beacon device, from among various contents set in the electronic devices.

In operation 1203, the electronic device 101 receives content identification information from at least one beacon device. Content identification information received from a beacon device is identification information designated in association with a predetermined location, such as location identification information associated with a location of the beacon device and device identification information associated with a beacon device. When the content identification information is received from the beacon device, the electronic device 101 determines whether to store or process the received content based on the scan filter 236.

In operation 1205, the electronic device 101 determines whether the received content identification information is available in the electronic device 101. According to an embodiment of the present disclosure, the electronic device 101 determines whether the received content identification information matches a content received in the electronic device 101, a content set in the electronic device 101, or a content activated in the electronic device 101. When the received content identification information is identical to identification information of a predetermined content, the electronic device 101 executes operation 1207, or when the received content identification information is identification that is not specified in the electronic device 101, the electronic device 101 terminates the embodiment of FIG. 12.

In operation 1207, the electronic device 101 provides a predetermined content corresponding to the received content identification information. According to an embodiment of the present disclosure, the electronic device 101 requests additional information corresponding to the received content identification information from the server 106, based on a selection of a user, or provides information associated with an objective to be executed in association with the received content identification information. For example, the electronic device 101 receives content identification information from a beacon device of a first point in a path set based on a navigation program. The electronic device 101 provides designated information based on the received content identification information, and receives, from the server 106, at least one information associated with the received content identification information based on a selection of a user, and provide the same. In addition, the electronic device 101 provides information associated with a second point that is set as a next point of the first point, based on set information.

In operation 1209, the electronic device 101 executes operation 1207, and determines whether an objective of the content provision mode set in the electronic device is completed. The electronic device 101 terminates the embodiment of FIG. 12 when the objective set in the content provision mode is achieved, and executes operation 1203 when the objective of the provision of the content is not achieved. It is apparent that the electronic device 101 terminates the embodiment of FIG. 12 based on a selection of a user. The electronic device 101 terminates the embodiment of FIG. 12, based on a determination of operation 1209.

Figure 13A:
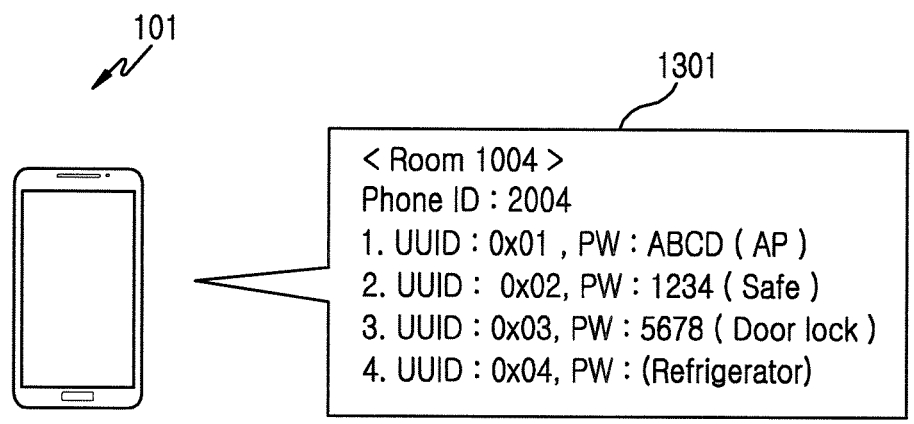
FIGS. 13A and 13B are diagrams illustrating examples for controlling at least one external device in an electronic device according to this disclosure.
Figure 13B:
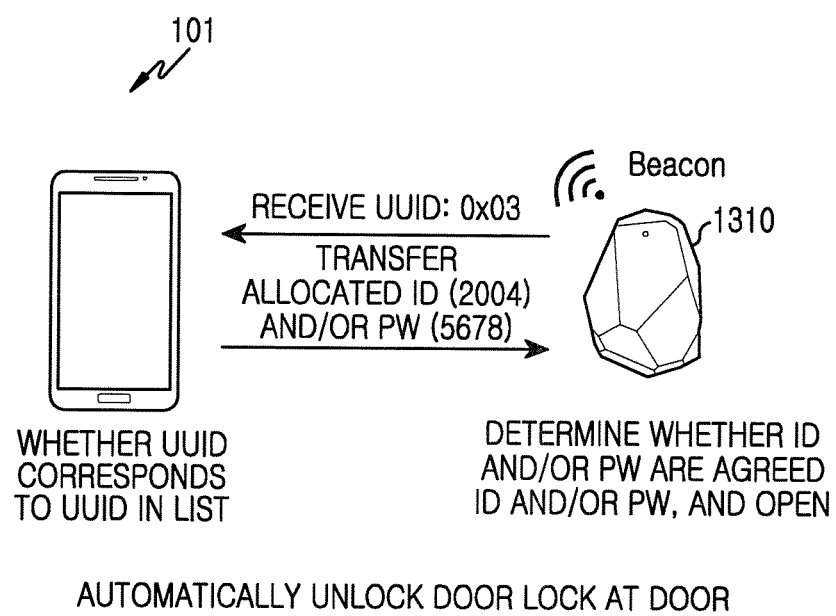

FIGS. 13A and 13B are diagrams illustrating various embodiments for controlling at least one external device in an electronic device. Hereinafter, various embodiments of the present disclosure will be described with reference to FIG. 13A. The electronic device 101 receives a content 1301 that controls at least one external device from the server 106, based on a selection of a user. According to an embodiment of the present disclosure, the electronic device 101 sends a request to the server 106 to receive the content 1301, or at least another electronic device requests the server 106 to transmit the designated content 1301 to the electronic device 101 and the electronic device 101 receives the content 1301. When content identification information is received from a beacon device, the electronic device 101 controls at least one external device corresponding to the content identification information based on the content 1301. According to an embodiment of the present disclosure, the content 1301 includes information that controls at least one device in a room 1004 designated in the electronic device 101 in a hotel. For example, the content 1301 includes at least one of device identification information of a wireless internet sharer (Access Point (AP)), a safe, a door lock, and a refrigerator and/or a password required to control each device, device identification information of the electronic device 101, and identification information of the room 1004 designated in the electronic device 101.

Hereinafter, various embodiments of the present disclosure will be described with reference to FIG. 13B. When controlling an external device through a received content, the electronic device 101 determines content identification information received from at least one beacon device 1310, and compares the determined content identification information with a designated content (for example, the content 1301 of FIG. 13A). The electronic device 101 controls at least one external device using the content identification information, based on the content 1301. According to an embodiment of the present disclosure, when a user who carries the electronic device 101 checks in at a hotel, the content 1301 is transmitted to the electronic device 101 based on the room 1004 for check-in. The content 1301 includes information that controls at least one external device included in the room 1004 and/or content identification information of the at least one external device. When the electronic device 101 is located in a data transmission/reception area of a beacon device 1310 located in a door lock of the room 1004, the electronic device 101 receives content identification information from the beacon device 1310 located in the door lock, and transmits a password of the door lock included in the content 1301 to the beacon device located in the door lock, based on the received content identification information.

The electronic device 101 also transmits device identification information of the electronic device 101 to the beacon device located in the door lock. When the password received from the electronic device 101 is identical to a password of the door lock, the door lock may be locked or unlocked. To determine whether to lock or unlock the door lock based on the password received from the electronic device 101, the beacon device located in the door lock makes determination based on whether the device identification information received from the electronic device 101 is device identification information designated in the electronic device 101 of the user who checks in at the room 1004. The electronic device 101 controls at least one external device designated in the content 1301 based on the above described method, when controlling at least one external device included in the room 1004.

Figure 14:
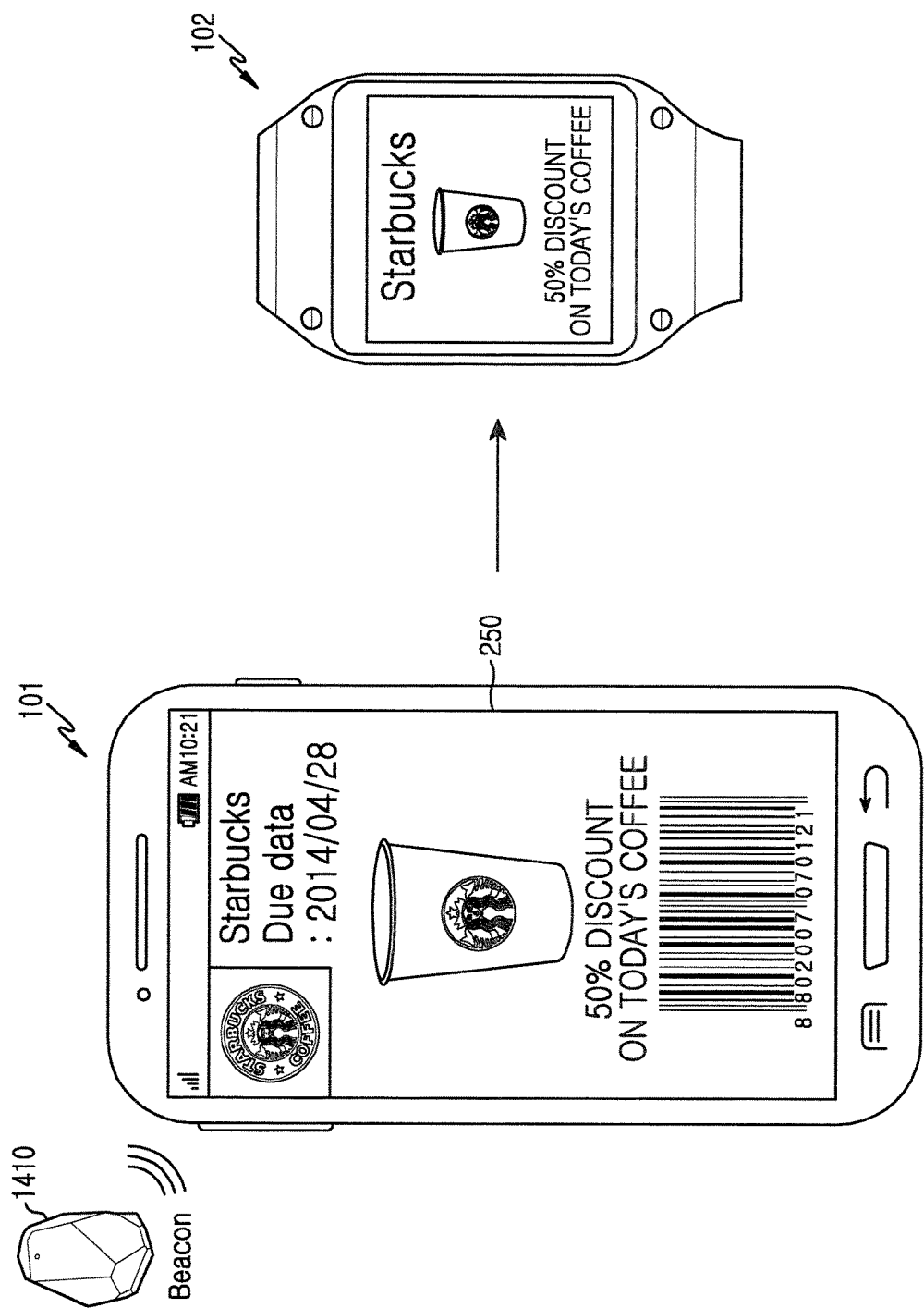
FIG. 14 is a diagram illustrating an example method in which content designated in an electronic device is provided in at least one external device according to this disclosure.

FIG. 14 is a diagram illustrating a process in which a content designated in an electronic device is provided in at least one external device, according to various embodiments of the present disclosure. The electronic device 101 transmits a predetermined content corresponding to content identification information received from at least one beacon device, so as to provide the same in at least one external device connected to the electronic device, based on a content received from the server 106. According to an embodiment of the present disclosure, the electronic device 101 is connected to at least another electronic device 102 (for example, a wearable device 102 such as a smart watch) through wireless communication such as BLUETOOTH® or Wifi, or the electronic device 101 and/or the wearable device 102 is set to provide a content that is provided in the electronic device 101, in the wearable device 102. The electronic device 101 receives content identification information from the beacon device 1410, and transmits a designated type of content obtained by processing a content corresponding to the content identification information so as to be provided in another designated electronic device (for example, the wearable device 102). Here, the designated type of processed content is a processed content to be provided in another designated electronic device (for example, the wearable device 102).

The processed content is received from the server 106, or is processed in the electronic device 101 and is transmitted to another electronic device (for example, the wearable device 102). When transmitting the processed content, the electronic device 101 determines a corresponding type of processed content based on state information received from another electronic device (for example, the wearable device 102) to which a content is to be transmitted. Here, the state information is information associated with a display size of another electronic device (for example, wearable device 102), a display resolution, information associated with whether a speaker exists or not. When content identification information is received from the beacon device 1410, the electronic device 101 displays a corresponding content in the display 250, determines a corresponding type of processed content based on the state information of another electronic device (for example, the wearable device 102), or processes a content based on the state information of another electronic device (for example, the wearable device 102) and transmit the same so that the other electronic device (for example, the wearable device 102) provides the same.

Figure 15:
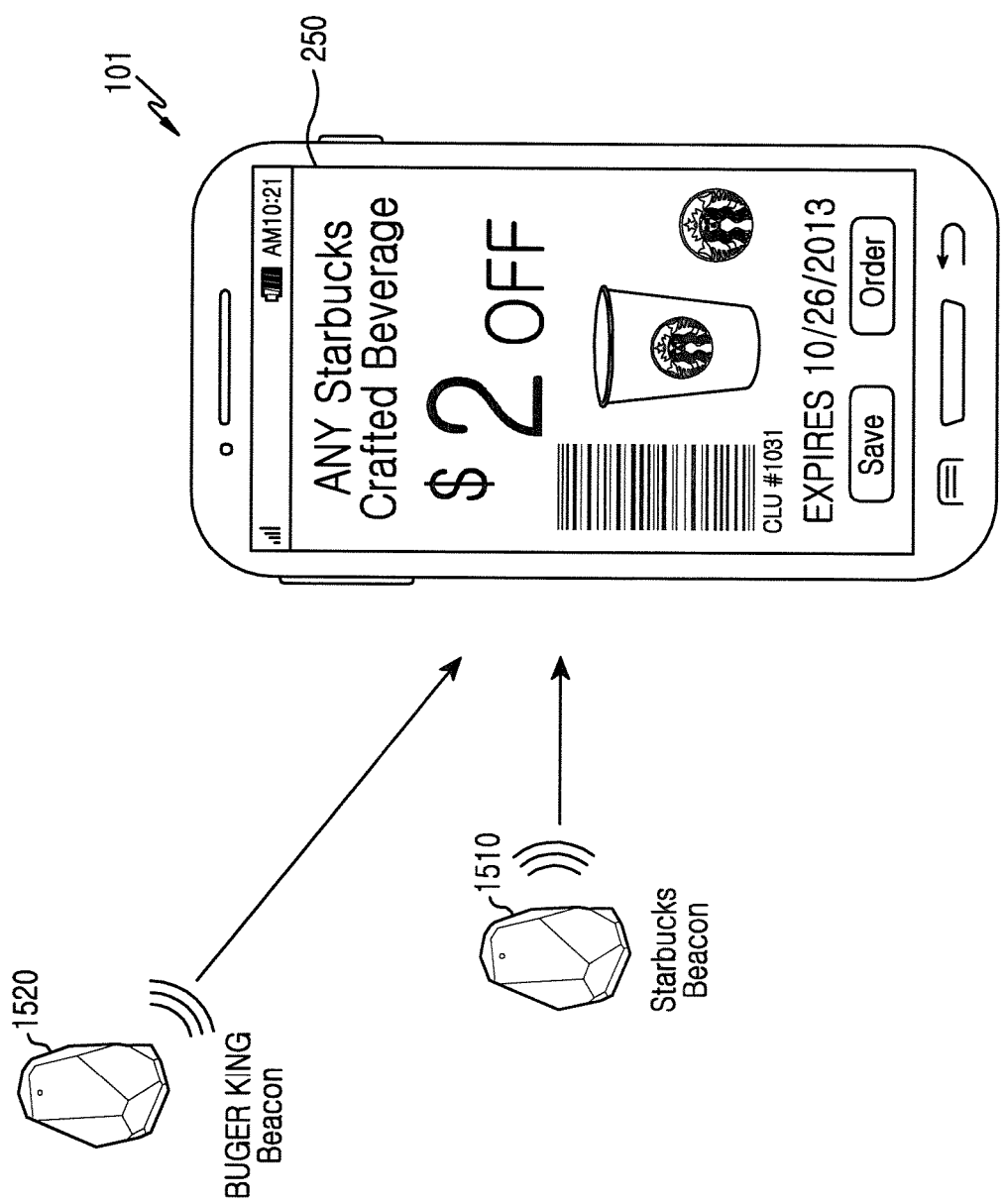
FIG. 15 is a diagram illustrating an example method in which an electronic device provides content based on a communication state with a beacon device according to this disclosure.

FIG. 15 is a diagram illustrating an example method in which an electronic device provides a content based on a communication state with a beacon device according to this disclosure. When content identification information is received from at least one beacon device, the electronic device 101 determines a priority for displaying a content based on information associated with a communication state with a beacon device. According to an embodiment of the present disclosure, the electronic device 101 receives content identification information from at least one beacon device. The electronic device 101 determines a distance to a beacon device, based on a signal strength of communication through which data is transmitted and received to/from the beacon device, when receiving content identification information from the beacon device. For example, the electronic device 101 receives packet data and/or content identification information from a beacon device that executes communication with a designated signal strength, and determines a distance between the electronic device 101 and the beacon device based on a strength of a signal through which the packet data and/or content identification information is received and a signal transmitted by the beacon device.

The electronic device 101 determines a distance to a beacon device that transmits content identification information, based on a strength of a communication signal at a point in time of receiving the content identification information from at least one beacon device. For example, the electronic device 101 receives content identification information from a beacon device 1510 of STARBUCKS® and a beacon device 1520 of Burger king. The electronic device 101 determines a distance to each beacon device, based on a signal strength of communication connected with a corresponding beacon device, at a point in time of receiving content identification information. The electronic device 101 determines that the beacon device 1510 of STARBUCKS® is closer than the beacon device 1520 of Burger king, and the electronic device 101 provides, in the electronic device 101, a content of STARBUCK® corresponding to the content identification information received from the beacon device 1520 of STARBUCKS® which is determined to be in a close distance.

According to various embodiments of the present disclosure, an operation method of an electronic device includes receiving, from a first server, a designated content including at least one piece of information associated with a second server, receiving content identification information from the second server in a state in which the electronic device is located in a short-range wireless communication area of the second server, and determining at least one information corresponding to the content identification information, from the designated content. According to an embodiment of the present disclosure, the operation method further includes displaying the at least same information in a display or transmitting the at least same information so as to provide the same in at least another device. According to an embodiment of the present disclosure, the designated content is a content that is selected by a user from among contents provided from the first server, or that is stored in setting information.

According to an embodiment of the present disclosure, the operation method further includes requesting transmission of additional information from the first server, and receiving the additional information from the first server, so as to display the same in a display. According to an embodiment of the present disclosure, the receiving operation receives the designated content of a predetermined content provider from among various contents received from at least two content providers. According to an embodiment of the present disclosure, the content identification information is point identification information corresponding to the location of the second server of a content provider or device identification information of the second server.

According to an embodiment of the present disclosure, the information associated with the second server is the content identification information of the second server. According to an embodiment of the present disclosure, the operation method furthers include comparing an expiration date included in the at least same information and time information of the electronic device, so as to determine whether the expiration date expires, and when it is determined that the expiration date expires, requesting the first server to check a content updated after the at least one information.

According to an embodiment of the present disclosure, the information associated with the second server includes at least one of a different content in a category identical or similar to the designated content provided by a content provider corresponding to the second server, a designated recommend content near the second server, a content associated with another event provided by the second server, and a content provided from another point of the content provider. According to an embodiment of the present disclosure, the operation method further includes filtering the designated content based on setting information included in the electronic device. According to an embodiment of the present disclosure, the at least one information is a part of the designated content, which is included in a result obtained after filtering based on the setting information. According to an embodiment of the present disclosure, the content includes two or more pieces of content identification information of which a sequence is designated. According to an embodiment of the present disclosure, displaying the at least one information further includes displaying at least one of the content that corresponds to content identification information having a priority subsequent to the content identification information of the second server. According to an embodiment of the present disclosure, the content includes at least one of an instruction that controls a device, a password, and device identification information of the electronic device.

According to an embodiment of the present disclosure, the operation method further includes transmitting, to the second server, the password or the instruction of the content corresponding to the content identification information received from the second server, wherein the second server executes a designated operation based on the received instruction or password. According to an embodiment of the present disclosure, the transmitting operation transmits at least one of the content that is processed based on state information of the other device. According to an embodiment of the present disclosure, the content is a content that is processed to be provided in at least another device and is received from the first server or a content that is processed in the electronic device. According to an embodiment of the present disclosure, the operation method further includes receiving content identification information from a third server, and determining a distance to the second server or the third server, wherein the displaying or the transmitting displays or transmits at least one of a content corresponding to content identification information of a server that is determined to be in a close distance.

According to various embodiments of the present disclosure, by providing a notification message associated with a new updated content, the electronic device determines and receives updated information associated with a designated content and determines latest information corresponding to a designated location even in a location where wireless communication connection is poor. The various embodiments of the present disclosure are implemented by at least one processor 220 based on one or more programs (or applications) included in the memory 230 of the electronic device 101. The processor 220 that implements the various embodiments of the present disclosure is an Application Processor (AP) generally used in electronic devices, or is a micro controller unit (MCU) that is set to implement the various embodiments of the present disclosure. In addition, the application and the MCU functionally works together so as to implement the various embodiments of the present disclosure.

According to various embodiments of the present disclosure, at least some of the devices or methods according to various embodiment of the present disclosure as defined by the appended claims and/or disclosed herein is implemented in the form of hardware, software, firm ware, or any combination (such as module or unit) of at least two of hardware, software, and firmware. The module is the smallest unit of an integrated component or a part thereof and also be the smallest unit that performs various embodiments of the present disclosure or a part thereof. The "module" is mechanically or electronically implemented. If implemented in software, a computer-readable storage medium (or storage medium readable by a computer) storing at least one program (or programming module) is provided. The software is implemented by instructions stored in a computer-readable storage medium in the form of a programming module. The at least one program includes instructions that cause the electronic device to perform the methods according to various embodiments of the present disclosure as defined by the appended claims and/or disclosed herein. When the command is executed by one or more processors (for example, the processor 220), the one or more processors execute a function corresponding to the command. The computer-readable storage medium is, for example, the memory 230. At least a part of the programming module is implemented (for example, executed) by, for example, the processor 220. At least a part of the programming module includes, for example, a module, a program, a routine, a set of instructions and/or a process for performing one or more functions.

The computer-readable storage medium includes magnetic media such as a hard disc, a floppy disc, and a magnetic tape; optical media such as a compact disc read only memory (CD-ROM) and a digital versatile disc (DVD); magneto-optical media such as a floptical disk; a hardware device specifically configured to store and execute program instructions (such as programming module), such as a read only memory (ROM), a random access memory (RAM), and a flash memory; an electrically erasable programmable read only memory (EEPROM); a magnetic disc storage device; any other type of optical storage device; and a magnetic cassette. Alternatively, any combination of some or all of the forms a memory in which the program is stored. Further, a plurality of such memories is included in the electronic device.

In addition, the program is stored in an attachable storage device capable of accessing the electronic device through a communication network such as the Internet, an intranet, a local area network (LAN), a wide LAN (WLAN), a storage area network (SAN), or any combination thereof. Such a storage device accesses the electronic device via an external port. Further, a separate storage device on the communication network accesses a portable electronic device. Any of the hardware devices as described above may be configured to work as one or more software modules in order to perform the operations according to various embodiments of the present disclosure, and vice versa.

Any of the modules or programming modules according to various embodiments of the present disclosure includes at least one of the above described elements, exclude some of the elements, or further include other additional elements. The operations performed by the modules, programming module, or other elements according to various embodiments of the present disclosure are executed in a sequential, parallel, repetitive, or heuristic manner. Further, some operations are executed according to another order or may be omitted, or other operations may be added.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method implemented using an electronic device, the method comprising:
    setting, based on a user input, a range of at least one content to be provided, wherein the at least one content is associated with at least one beacon device;
    transmitting, via a communication module of the electronic device to a server, information regarding the range of the at least one content;
    based at least in part on the at least one content being updated on the server by a content provider, receiving the at least one content from the server;
    storing the at least one content in a memory of the electronic device;
    after storing the at least one content, in response to the electronic device entering a coverage of a beacon device among the at least one beacon device, receiving, from the beacon device, via the communication module, a signal including identification information associated with the beacon device;

in response to receiving the signal, bypassing to request a content corresponding to the identification information to the server and identifying, among the at least one content stored in the memory, the content corresponding to the identification information; and displaying the content via a display of the electronic device.

2. The method of claim 1, further comprising:

identifying whether a content corresponding to the identification information is included in the at least one content that is stored in the memory;

in response to identifying that the content is included in the at least one content, bypassing to request the content to the server and displaying the content that is stored in the memory; and in response to identifying that the content is not included in the at least one content, requesting the content to the server.

3. The method of claim 1, further comprising:

transmitting, to the server, a signal for requesting an additional content associated with the displayed content; and receiving the additional content from the server to display additional information via the display.

4. The method of claim 1, further comprising;

authenticating the at least one content by receiving a user input;

in response to receiving the signal, determining that the content corresponding to the identification information is authenticated; and in response to determining that the content is authenticated, displaying the content on the display.

5. The method of claim 1, further comprising, determining whether the content is up-to-date by comparing first version information included in the signal with version information included in the content, and if it is determined that the content is not up-to-date, transmitting, to the server, a signal for requesting latest version of the content.

6. The method of claim 1, further comprising:

comparing an expiration date included in the content with time information when the signal is received from the beacon device to determine whether the expiration date expires; and in response to determining that the expiration date expires, transmitting, to the server, a signal for requesting an additional content associated with the content.

7. The method of claim 1, further comprising:

filtering the content based on setting information included in the electronic device.

8. The method of claim 7, wherein the setting information comprises, as a criterion of the filtering, expiration time information of the content, location information of a provider associated with the content, and a category of the content.

9. An electronic device, the device comprising:

a communication module;

a memory storing instructions;

a display; and a processor configured to execute the stored instructions to:

set, based on a user input, a range of at least one content to be provided, wherein the at least one content is associated with at least one beacon device, transmit, via the communication module to a server, information regarding the range of the at least one content, based at least in part on the at least one content being updated on the server by a content provider, receive, via the communication module, the at least one content from the server, store the at least one content in the memory, after storing the at least one content, in response to the electronic device entering a coverage of a beacon device among the at least one beacon device, receive, from the beacon device, via the communication module, a signal including identification information associated with the beacon device, in response to receiving the signal, bypass requesting a content corresponding to the identification information to the server and identify, among the at least one content stored in the memory, the content corresponding to the identification information, and display the content via the display.

10. The device of claim 9, wherein the processor is configured to executed the stored instructions to:

identify whether a content corresponding to the identification information is included in the at least one content that is stored in the memory;

in response to identifying that the content is included in the at least one content, bypass requesting the content to the server and display the content that is stored in the memory; and in response to identifying that the content is not included in the at least one content, request the content to the server.

11. The device of claim 9, wherein the processor is configured to executed the stored instructions to:

transmit, to the server, a signal for requesting an additional content associated with the displayed content; and receive the additional content from the server to display additional information via the display.

12. The device of claim 9, wherein the processor is configured to executed the stored instructions to:

authenticate the at least one content by receiving a user input;

in response to receiving the signal, determine that the content corresponding to the identification information is authenticated; and in response to determining that the content is authenticated, display the content on the display.

13. The device of claim 9, wherein the processor is configured to executed the stored instructions to determine whether the content is up-to-date by comparing first version information included in the signal with version information included in the content, and if it is determined that the content is not-to-date, transmitting, to the server, a signal for requesting latest version of the content.

14. The device of claim 9, wherein the processor is configured to executed the stored instructions to compare an expiration date included in the content with time information when the signal is received from the beacon device to determine whether the expiration date expires; and in response to determining that the expiration date expires, transmit, to the server, a signal for requesting an additional content associated with the content.

15. The device of claim 9, wherein the processor is configured to executed the stored instructions to filter the content based on setting information included in the electronic device.

16. The device of claim 15, wherein the setting information comprises, as a criterion of the filtering, expiration time information of the content, location information of a provider associated with the content, and a category of the content.

* * * * *